United States Patent
Kawabe et al.

(10) Patent No.: US 8,159,846 B2
(45) Date of Patent: Apr. 17, 2012

(54) SWITCHING CONTROL CIRCUIT, SEMICONDUCTOR DEVICE AND SWITCHING POWER SOURCE APPARATUS

(75) Inventors: Keita Kawabe, Hyogo (JP); Kazuhiro Murata, Osaka (JP); Yoshihiro Mori, Kyoto (JP); Naohiko Morota, Hyogo (JP)

(73) Assignee: Panasonic Corporation, Osaska (JP)

( * ) Notice: Subject to any disclaimer, the term of this patent is extended or adjusted under 35 U.S.C. 154(b) by 504 days.

(21) Appl. No.: 12/499,308

(22) Filed: Jul. 8, 2009

(65) Prior Publication Data
US 2010/0008106 A1    Jan. 14, 2010

(30) Foreign Application Priority Data
Jul. 9, 2008  (JP) .................................. 2008-178698

(51) Int. Cl.
H02M 7/539  (2006.01)

(52) U.S. Cl. ...................................... 363/97; 363/21.13

(58) Field of Classification Search ............... 363/21.01, 363/21.05, 21.13, 97
See application file for complete search history.

(56) References Cited

U.S. PATENT DOCUMENTS

| | | | |
|---|---|---|---|
| 6,914,789 B2 | 7/2005 | Kinoshita et al. | |
| 6,980,444 B2 * | 12/2005 | Takahashi | 363/21.18 |
| 7,215,107 B2 | 5/2007 | Djenguerian et al. | |
| 7,616,461 B2 * | 11/2009 | Yang et al. | 363/56.1 |
| 7,755,917 B2 * | 7/2010 | Djenguerian et al. | 363/95 |
| 2007/0008753 A1 | 1/2007 | Kroes | |
| 2007/0008756 A1 | 1/2007 | Djenguerian et al. | |
| 2007/0176583 A1 | 8/2007 | Hachiya et al. | |
| 2010/0008106 A1 * | 1/2010 | Kawabe et al. | 363/21.01 |

FOREIGN PATENT DOCUMENTS
| | | | |
|---|---|---|---|
| JP | 2007-20393 A | 1/2007 | |
| JP | 2007-20394 A | 1/2007 | |

* cited by examiner

*Primary Examiner* — Jeffrey Sterrett
(74) *Attorney, Agent, or Firm* — RatnerPrestia

(57) ABSTRACT

At the starting time and an overload time in which the output voltage of the switching power source apparatus is low, if an overcurrent state, in which the ON period of the switching device becomes short and a current not less than the current limit value of the switching device flows through the switching device, occurs, this overcurrent state is detected. The blanking period of a blanking pulse signal is made shorter than the blanking period that is obtained during steady operation, and the ON period of the switching device is made shorter. Hence, the device current flowing through the switching device can be made small in each pulse for the switching operation, and, at the same time, the device current is suppressed from increasing each time a pulse for the switching operation is generated.

17 Claims, 24 Drawing Sheets

SWITCHING CONTROL CIRCUIT, SEMICONDUCTOR DEVICE AND SWITCHING POWER SOURCE APPARATUS

The disclosure of Japanese Patent Application No. 2008-178698 filed Jul. 9, 2008 including specification, drawings and claims is incorporated herein by reference in its entirety.

BACKGROUND OF THE INVENTION

1. Field of Invention

The present invention relates to a switching control circuit, a semiconductor device and a switching power source apparatus having an overcurrent protection function for protecting a switching device.

2. Description of Related Art

In a switching power source apparatus for supplying a stable DC voltage to a load, current limitation is generally provided to prevent a current having a predetermined value or more from flowing through a switching device. However, at the starting time and an overload time in which the output voltage of the switching power source apparatus is low, the current having the predetermined value or more flows through the switching device, that is, the so-called overcurrent state of the switching device occurs, and the current may become equal to or larger than the allowable current value of the switching device in some cases. For the purpose of preventing the switching device from being degraded and damaged by the overcurrent, in the case that the overcurrent state of the switching device occurs, protection is required to suppress the current flowing through the switching device from increasing or to reduce the current immediately.

First, in a conventional switching power source apparatus, the causes of the overcurrent state of the switching device will be described below.

FIG. 16 is a block diagram showing a configuration example of a conventional switching power source apparatus. This switching power source apparatus is a flyback power source equipped with a switching transformer 101 having a primary winding 101a and a secondary winding 101b. A switching device 103 in a switching control circuit 102 is connected in series with the primary winding 101a, and an input voltage VINp is applied to the primary winding 101a and the switching device 103. The switching device 103 is ON/OFF controlled by a control circuit 104, and power is transferred from the primary winding 101a to the secondary winding 101b of the switching transformer 101.

The AC voltage induced across the secondary winding 101b of the switching transformer 101 by the ON/OFF operation (hereafter referred to as a switching operation) of the switching device 103 is rectified and smoothed by an output voltage generating circuit 105 containing a diode 105a and a capacitor 105b, whereby an output voltage VOUTp is generated and supplied to a load 106. This output voltage VOUTp is detected by an output voltage detection circuit 107, and a feedback signal FB_Sp corresponding to the voltage level of the output voltage VOUTp is fed back to the control circuit 104. Hence, the switching operation is controlled and energy to be supplied to the load 106 is adjusted, whereby the output voltage VOUTp is stabilized to a predetermined voltage.

FIG. 17 is a block diagram showing a configuration example of the conventional switching control circuit 102 for use in the switching power source apparatus.

In FIG. 17, the switching control circuit 102 contains the switching device 103 and the control circuit 104. Current mode PWM control is adopted as a method for controlling the ON/OFF operation of the switching device 103.

When the switching device 103 is turned ON, a device current IDp flowing through the switching device 103 is detected by a device current detection circuit 111, and the device current IDp is compared with a target level IL_1p in a comparison circuit 112. When the level of the device current IDp becomes higher than the target level IL_1p, the comparison circuit 112 outputs a comparison result signal OC_1p corresponding to the result of the comparison as an input signal to an AND circuit 113. Another input signal of the AND circuit 103 is output from a blanking pulse generating circuit 114. This input signal is a blanking pulse signal BLKp for preventing the switching device 103 from being turned OFF for a constant period (hereafter referred to as a blanking period TBLKp) after the switching device 103 was turned ON. This blanking period TBLKp is provided to prevent a malfunction in which the switching device 103 is turned OFF by a spike current flowing through the switching device 103 immediately after the switching device 103 was turned ON.

Hence, control is performed so that the comparison result signal OC_1p is output from the comparison circuit 112 and an output signal OFF_1p is output from the AND circuit 113 after the blanking period TBLKp has passed to turn OFF the switching device 103. Furthermore, a delay time Td exists between the time when the device current IDp is detected to have become higher than the target level IL_1p at the comparison circuit 112 and the time when the switching device 103 is actually turned OFF.

In other words, in the switching control circuit 102, the device current IDp is limited by the comparison circuit 112 so that the level of the device current IDp does not become the target level IL_1p or more. In addition, the switching device 103 is configured so as to be turned ON for a period not less than a minimum ON period Tonminp determined by the sum of the blanking period TBLKp and the delay time Td.

Herein, in the switching power source apparatus, operation at the starting time in which the input voltage VINp is applied and the output voltage VOUTp has not yet risen will be described below. FIG. 18 is a timing chart showing the timing of the operation performed at this time.

As shown in FIG. 18, when the input voltage VINp rises, the PWM control of the switching device 103 is started, and the device current IDp flows periodically. However, since the output voltage VOUTp is low, as the input voltage VINp rises, the ON period of the switching device 103 becomes shorter each time a pulse is generated. If the ON period of the switching device 103 becomes short to the minimum ON period Tonminp in a clock period C2p, the switching device 103 is surely turned ON for only the minimum ON period Tonminp in each clock period, and the current limitation of the device current IDp by the comparison circuit 112 of the control circuit 104 does not work. For this reason, an overcurrent state occurs in which the device current IDp having a level equal to or more than the target level IL_1p flows through the switching device 103 for the minimum ON period Tonminp in the clock period C2p and thereafter. Furthermore, as the time passes in the order of a clock period C3p and a clock period C4p, the device current IDp increases. If the device current IDp reaches the allowable current value or more of the switching device 103, there is a fear of degrading and damaging the switching device 103.

Next, overcurrent protection for the switching device in the conventional switching power source apparatus will be described below.

For example, in the switching control circuit disclosed in U.S. Patent Application Publication No. 2007/0008753 A1 (corresponding to Japanese Laid-open Patent Publication No. 2007-20394), the state obtained at the time when the level of the device current flowing through the switching device became higher than the limit level for overcurrent detection is detected as the overcurrent state of the switching device, and the frequency of the switching operation is switched to a lower frequency, whereby overcurrent protection is achieved.

FIG. 19 is a block diagram showing a configuration example of this switching control circuit. Blocks corresponding to the blocks constituting the switching control circuit shown in FIG. 17 are designated by the same numerals, and their descriptions are omitted.

In a switching control circuit 102a shown in FIG. 19, the device current IDp is compared by a comparison circuit 120 with a limit level signal IL_2p that is preset so as to be higher than the target level IL_1p in the comparison circuit 112, and a comparison result signal OC_2p is output from this comparison circuit 120. After the blanking period TBLKp has passed, an output signal OFF_2p output from an AND circuit 121 is input to a frequency control circuit 123 via a flip-flop circuit 122. Then, the clock frequency of a clock generating circuit 116 is controlled using an output signal FRQ_Cp from this frequency control circuit 123.

FIG. 20 is a timing chart showing the timing of overcurrent protection operation in the case that this switching control circuit 102a is used for the switching power source apparatus shown in FIG. 16, for example.

The ON period of the device current ID2p being subjected to overcurrent protection and shown in FIG. 20 becomes short to the minimum ON period Tonminp in the clock period C2p as described above. Furthermore, the frequency control circuit 123 detects the state obtained at the time when the level of the device current ID2p rose to the limit level signal IL_2p as shown in a waveform portion F20a as the overcurrent state of the switching device, and switches the clock frequency of the clock generating circuit 116 to a lower frequency. As a result, the OFF period Toff1p of the device current ID2p in the switching operation becomes longer than the OFF period of the device current ID1p that is not subjected to overcurrent protection, and the device current ID2p lowers by a device current drop amount ID1p. As described above, overcurrent protection is achieved by suppressing the device current ID2p from increasing each time a pulse for the switching operation is generated.

Moreover, for example, a switching power source apparatus disclosed in U.S. Patent Application Publication No. 2007/0008756 A1 (corresponding to Japanese Laid-open Patent Publication No. 2007-20393) detects the state obtained at the time when the ON period of the switching device became shortened to a threshold period as the overcurrent state of the switching device, and the frequency of the switching operation is switched to a lower frequency as in the case of the switching control circuit shown in FIG. 19, whereby overcurrent protection is achieved.

FIG. 21 is a block diagram showing a configuration example of this switching control circuit. Blocks corresponding to the blocks constituting the switching control circuits shown in FIGS. 17 and 19 are designated by the same numerals, and their descriptions are omitted.

This switching control circuit 102b differs from the switching control circuit 102a shown in FIG. 19 in that the switching control circuit 102b is equipped with a short ON period detection circuit 124 instead of the comparison circuit 120 and the AND circuit 121. Three signals, an output signal ROFF_1p (the inverted signal of the output signal of the AND circuit 113), a blanking pulse signal BLKp and a control signal DRIVEp in the switching operation, are input to this short ON period detection circuit 124. Furthermore, the short ON period detection circuit 124 detects the state obtained at the time when the ON period of the switching device 103 became shortened to the threshold period by these three input signals as the overcurrent state of the switching device 103, and outputs an output signal ROFF_2p.

The output signal ROFF_2p is input to the frequency control circuit 123 via the flip-flop circuit 122 as in the case of the switching control circuit 102a shown in FIG. 19. The frequency of the clock signal CLOCKp generated by the clock generating circuit 116 is controlled by an output signal FREQ_Cp from the frequency control circuit 123.

Hence, the switching control circuit 102b differs from the switching control circuit 102a shown in FIG. 19 in the configuration of detecting the overcurrent state of the switching device.

FIG. 22 is a timing chart showing timing at the starting time in the case that the switching control circuit 102b shown in FIG. 21 is used for the switching power source apparatus shown in FIG. 16, for example.

In FIG. 22, the state obtained at the time when the ON period of the switching device 103 became shortened to a threshold period Ton1p (FIG. 22 shows a case in which the threshold period Ton1p is equal to the minimum ON period Tonminp) is detected as the overcurrent state of the switching device 103, and the frequency of the clock signal CLOCKp generated by the clock generating circuit 116 is switched to a lower frequency. As a result, the OFF period Toff2p of the device current ID2p in the switching operation becomes longer, and the device current ID2p lowers by a device current drop amount ID2p. As described above, overcurrent protection is achieved by suppressing the device current ID2p from increasing each time a pulse for the switching operation is generated. The switching control circuit 102b activates overcurrent protection earlier than the case in which the switching control circuit 102a shown in FIG. 19 is used, that is, before the device current ID2p becomes large.

SUMMARY OF THE INVENTION

However, the overcurrent protection methods in the conventional switching control circuits have the following problems.

As described above, in the overcurrent protection methods disclosed in U.S. Patent Application Publication No. 2007/0008753 A1 and U.S. Patent Application Publication No. 2007/0008756 A1, the overcurrent state of the switching device 103 is detected, and the frequency of the switching operation is switched to a lower frequency. Hence, the OFF period is made longer, and the device current IDp is suppressed from increasing each time a pulse for the switching operation is generated after the detection of the overcurrent, whereby the overcurrent is prevented from continuously flowing through the switching device 103. However, as the inclination of the waveform of the device current IDp is larger and as the increment of the device current IDp in each pulse is larger, the device current IDp increases further each time a pulse is generated. As a result, the effect of suppressing the device current IDp from increasing each time a pulse is generated is lessened. For the purpose of enhancing the effect of suppressing the device current, the frequency of the switching operation should only be lowered. However, if the frequency of the switching operation is lowered excessively, energy required to raise the output voltage VOUTp to a predetermined voltage is not obtained, for example, at the starting time, and another problem, that is, a faulty starting state in which the power source cannot be started, occurs.

FIG. 23 is a waveform diagram showing the device current IDp in the case that the overcurrent state of the switching device 103 has occurred when the inclination of the waveform of the device current IDp is large. Since the above-mentioned conventional overcurrent protection is activated, the frequency of the switching operation is switched to a sufficiently lower frequency, and OFF periods Toff3p and Toff4p have become sufficiently long.

The inclination of the waveform of the device current IDp is determined by the ratio of the input voltage VINp to the inductance Lap of the primary winding 101a of the switching transformer 101 (VINp/Lab). Hence, in the case that the input voltage VINp is high and the inductance Lap is small, the inclination of the waveform of the device current IDp becomes large.

In FIG. 23, each of the OFF periods Toff3p and Toff4p is sufficiently long, and the initial current of the device current IDp in each pulse is zero. In other words, when the switching device 103 is turned ON, no energy is stored in the switching transformer 101. However, since the inclination of the waveform of the device current IDp is large, the peak value IDpk1p of the device current IDp becomes far larger than the target level IL_1p, and the overcurrent state cannot be resolved. In this case, the device current IDp cannot be lowered even if the OFF period is extended longer. If the input voltage VINp becomes higher, for example, at the starting time, the device current IDp may reach the allowable current value of the switching device 103. Moreover, in the case that the inductance Lab becomes small due to variations and temperature characteristics of the components of the switching transformer 101, the inclination of the waveform of the device current IDp also becomes large, and it is thus difficult to activate protection securely.

Furthermore, the magnitude of the initial current of the device current IDp in each pulse depends on the rate at which the energy stored in the switching transformer 101 decreases in the OFF period, that is, the inclination of the waveform of the current flowing through the secondary winding 101b of the switching transformer 101 in the OFF period, and is determined by the ratio of the output voltage VOUTp to the inductance Lbp of the secondary winding 101b (VOUTp/Lbb). Hence, in particular, as the output voltage VOUTp becomes lower, the inclination of the waveform of the current flowing through the secondary winding 101b becomes smaller, and the initial current of the device current IDp in each pulse becomes larger.

In FIG. 24, for example, the output voltage VOUTp is limitlessly close to zero and the energy stored in the switching transformer 101 hardly decreases in each of the OFF periods Toff3p and Toff4p. In this case, the overcurrent state of the switching device 103 occurs, the above-mentioned conventional overcurrent protection is activated, the frequency of the switching operation is switched to a sufficiently lower frequency, and each of the OFF periods Toff3p and Toff4p becomes sufficiently long.

However, the energy stored in the switching transformer 101 hardly decreases in each of the OFF periods Toff3p and Toff4p as shown by a waveform line F24a. Hence, even if the OFF period is extended longer, the initial current of the device current IDp becomes larger each time a pulse for the switching operation is generated. As a result, the peak value IDpk2p of the device current IDp becomes far larger than the target level L_1p and increases each time a pulse is generated, although the overcurrent protection is activated. Hence, in this case, there occurs a problem in which the effect of the overcurrent protection is not obtained.

Furthermore, in the case that the inclination of the waveform of the device current IDp is large, the output voltage VOUTp is very low and the energy stored in the switching transformer 101 hardly decreases in the OFF period, the above-mentioned two phenomena are combined. As a result, the conventional overcurrent protection methods cannot protect the switching device 103 from being degraded and damaged.

In consideration of the above-mentioned problems, an object of the present invention is to perform overcurrent protection for a switching device by detecting the overcurrent state of the switching device securely even in a case in which the inclination of the waveform of the device current of the switching device is large or even in a case in which the energy stored in a switching transformer hardly decreases in the OFF periods of the switching device.

For the purpose of solving the above-mentioned problems, a switching power source apparatus according to the present invention has a switching device being switched between an ON state and an OFF state repeatedly; a current detection circuit operable to detect the magnitude of the current flowing through the switching device and to generate a current detection signal; a target level setting circuit operable to set the target level of the current detection signal; a comparison circuit operable to compare the level of the current detection signal with the target level and to generate a comparison result signal; a drive signal generating circuit operable to generate a drive signal whose level periodically changes from a first level to a second level and changes from the second level to the first level on the basis of the comparison result signal; a comparison result signal nullification circuit operable to generate a nullification period to nullify the comparison result signal on the basis of the drive signal immediately after the level of the drive signal was changed from the first level to the second level; and a nullification period adjustment circuit operable to generate a nullification period adjustment signal representing a signal for adjusting the nullification period after detecting the overcurrent state of the switching device on the basis of the current detection signal, wherein the switching device is in the ON state when the level of the drive signal is the first level and is in the OFF state when the level of the drive signal is the second level, and the period of the ON state is shortened when the nullification period adjustment circuit is generated.

In addition, the semiconductor device according to the present invention is configured such that the above-mentioned switching control circuit is formed of one semiconductor chip.

Furthermore, the semiconductor device according to the present invention device is formed of multiple semiconductor chips and the multiple semiconductor chips are incorporated into one module.

Moreover, the switching power source apparatus according to the present invention contains the above-mentioned switching control circuit.

Still further, the switching power source apparatus according to the present invention contains the above-mentioned semiconductor device.

With the switching control circuit, the semiconductor device and the switching power source apparatus according to the present invention, at the starting time and an overload time in which the output voltage of the switching power source apparatus is low, if an overcurrent state, in which the ON period of the switching device becomes short and a current not less than the current limit value of the switching device flows through the switching device, occurs, this overcurrent state is detected. The nullification period is made shorter than the nullification period that is obtained during steady operation, and the ON period of the switching device is made short. Hence, the current flowing through the switching device can be made small in each pulse for the switching operation, and, at the same time, the current can be suppressed from increasing each time a pulse for the switching operation is generated. For this reason, the overcurrent state of the switching device can be resolved, and degradation of and damage to the switching device due to the flow of the device current not less than the allowable current value can be prevented.

In addition, in the case that the inclination of the waveform of the current flowing through the switching device is large, that is, in the case that the rate of increase in the current in each pulse for the switching operation is high, and even in the case that the output voltage is limitlessly close to zero and the energy stored in the switching transformer hardly decreases in the OFF period of the switching device, protection is activated to shorten the ON period in each pulse for the switching operation. Hence, the current in each pulse for the switching operation can be made small, and the increase in the current in each pulse for the switching operation can be suppressed. As a result, the switching device can be prevented from being degraded and damaged.

Furthermore, even in the case that the characteristics of the components inside the switching power source apparatus have changed due to variations and temperature characteristics of the components, protection is activated to shorten the ON period in each pulse for the switching operation. As a result, the effect hardly decreases, and the reliability of the switching power source apparatus can be improved.

Moreover, the switching device and the control circuit can be provided inside one semiconductor chip and formed into a monolithic IC easily. As described above, by providing the main circuit components inside one semiconductor chip, the number of components constituting the circuit can be reduced. Hence, a switching control circuit serving as a power source apparatus can be made smaller in size, lighter in weight and lower in cost easily.

DETAILED DESCRIPTION OF THE PREFERRED EMBODIMENTS

Figure 1:
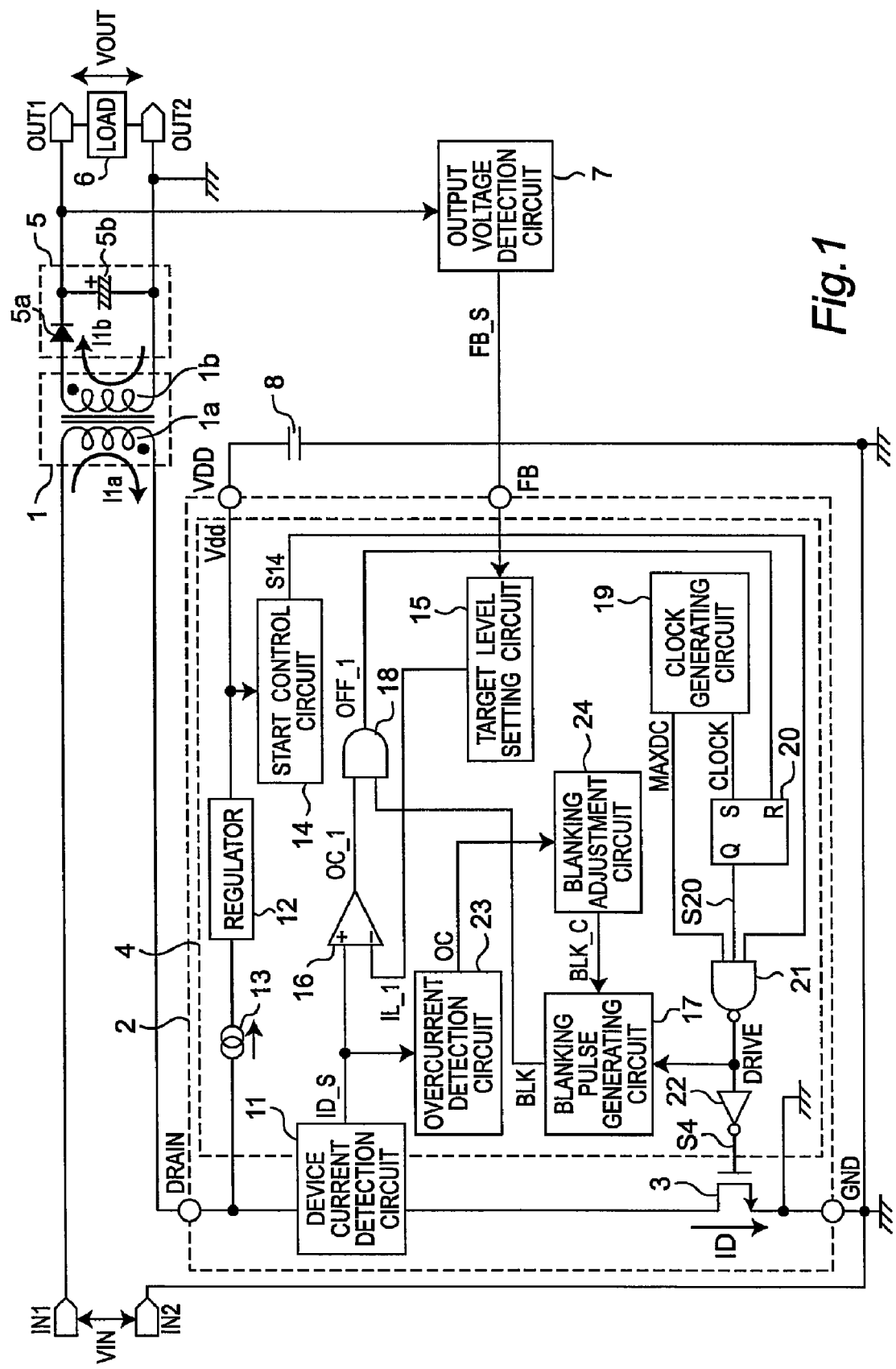
FIG. 1 is a block diagram showing a configuration example of a switching power source apparatus according to Embodiment 1 of the present invention.

Some examples of the best modes for embodying the present invention will be described below referring to the accompanying drawings. In the drawings, components having substantially the same configurations, operations and effects are designated by the same reference codes. Numbers described below are all exemplified to specifically explain the present invention, and the present invention is not limited by the exemplified numbers. Furthermore, the logic levels represented by high/low levels or the switching states represented by ON/OFF states are used to specifically exemplify the present invention, and similar results can also be obtained by variously combining exemplified logic levels or switching states. Moreover, connections between the components are exemplified to specifically explain the present invention, and connections for achieving the functions of the present invention are not limited to these connections. Still further, although embodiments described below are configured using hardware and/or software, a configuration implemented by hardware can also be implemented by software, and a configuration implemented by software can also be implemented by hardware.

Embodiment 1

FIG. 1 is a block diagram showing a configuration example of a switching power source apparatus according to Embodiment 1.

This switching power source apparatus is configured by using the current mode PWM (pulse-width modulation) control method as a method for controlling the switching operation of a switching device.

In FIG. 1, the switching power source apparatus contains an input terminal IN1, an input terminal IN2, an output terminal OUT1, an output terminal OUT2, a switching transformer 1, an output voltage generating circuit 5, an output voltage detection circuit 7, a capacitor 8, and a switching control circuit 2. The switching power source apparatus supplies a substantially DC output voltage VOUT to a load 6 connected across the output terminals OUT1 and OUT2 on the basis of a substantially DC input voltage VIN input across the input terminals IN1 and IN2. The switching control circuit 2 contains a switching device 3, a drain terminal DRAIN, an internal circuit power source terminal VDD, a feedback signal input terminal FB, a ground terminal GND, and a control circuit 4. The switching transformer 1 has a primary winding 1a and a secondary winding 1b. The potential of the ground terminal GND is maintained at the ground potential, and the ground terminal GND functions as the ground terminal of the entire switching power source apparatus.

The input terminal IN2 is connected to the ground terminal GND. One terminal of the primary winding 1a is connected to the input terminal IN1, and the other terminal of the primary winding 1a is connected to the drain of the switching device 3 via the drain terminal DRAIN. The gate of the switching device 3 is connected to the gate driver 22 of the control circuit 4, and the source of the switching device 3 is connected to the ground terminal GND. The switching device 3 is ON/OFF controlled on the basis of a control signal S4 generated by the control circuit 4, more particularly, by the gate driver 22. In other words, the switching device 3 is switched between the ON state and the OFF state repeatedly, thereby switching a device current ID flowing between the drain and the source of the switching device 3. The device current ID is also simply referred to as a current.

The switching device 3 is formed of one transistor device, such as an NMOS (negative-channel metal-oxide semiconductor) transistor or an IGBT (insulated gate bipolar transistor) transistor, but may also be formed of multiple transistor devices.

The secondary winding 1b is connected to the output voltage generating circuit 5 formed of a diode 5a and a capacitor 5b. One terminal of the secondary winding 1b is connected to the anode of the diode 5a, and the other terminal of the secondary winding 1b is connected to the ground terminal GND. The cathode of the diode 5a is connected to the positive terminal of the capacitor 5b, and the negative terminal of the capacitor 5b is connected to the ground terminal GND. The positive terminal of the capacitor 5b is connected to the output terminal OUT1, and the negative terminal of the capacitor 5b is connected to the output terminal OUT2.

The primary winding 1a and the secondary winding 1b of the switching transformer 1 have opposite polarities, and the switching power source apparatus has a flyback configuration. In a period in which the switching device 3 is in the ON state, a primary current I1a (substantially equal to the device current ID) flows through the primary winding 1a from the input terminal IN1 to the drain terminal DRAIN on the basis of the input voltage VIN, and energy is stored. At this time, a secondary current I1b attempts to flow in a direction of canceling this energy, that is, in a direction opposite to the conduction direction of the diode 5a (in a direction opposite to the direction of the secondary current I1b shown in FIG. 1), but the current is blocked by the diode 5a and does not flow. Next, when the switching device 3 is turned OFF, the secondary current I1b flows in the conduction direction of the diode 5a on the basis of the stored energy and is smoothed by the capacitor 5b.

As described above, the switching transformer 1 converts the input voltage switched by the switching device 3 into an output AC current. The output voltage generating circuit 5 rectifies and smooths the output AC voltage induced in the secondary winding 1b by the switching operation of the switching device 3, thereby generating the output voltage VOUT and supplying the output voltage VOUT at the load 6 connected across the output terminals OUT1 and OUT2.

The output voltage detection circuit 7 detects the voltage level of the output voltage VOUT and outputs a feedback signal FB_S proportional to the voltage level of the output voltage VOUT to a target level setting circuit 15 inside the control circuit 4 via the feedback signal input terminal FB of the switching control circuit 2 on the basis of the voltage level of the output voltage VOUT. The feedback signal FB_S is also referred to as an output voltage detection signal. A capacitor 8 is connected between the internal circuit power source terminal VDD and the ground terminal GND.

The control circuit 4 contains a starting constant current source 13, a regulator 12, a start control circuit 14, a device current detection circuit 11, a comparison circuit 16 for device current detection, an AND circuit 18, the target level setting circuit 15, an overcurrent detection circuit 23, a blanking adjustment circuit 24, a blanking pulse generating circuit 17, a clock generating circuit 19, a flip-flop circuit 20, a three-input NAND circuit 21, and the gate driver 22.

The device current detection circuit 11 is also simply referred to as a current detection circuit. The comparison circuit 16 for device current detection is also simply referred to as a comparison circuit. The AND circuit 18 is also referred to as a nullification execution circuit. The blanking adjustment circuit 24 is also referred to as a nullification period adjustment signal generating circuit. The blanking pulse generating circuit 17 is also referred to as a nullification signal generating circuit. The blanking pulse generating circuit 17 and the AND circuit 18 constitute a comparison result signal nullification circuit. The overcurrent detection circuit 23 and the blanking adjustment circuit 24 constitute a nullification period adjustment circuit. The clock generating circuit 19, the flip-flop circuit 20 and the three-input NAND circuit 21 constitute a drive signal generating circuit.

The starting constant current source 13 is connected between the drain terminal DRAIN and the regulator 12 and supplies a starting circuit current to the capacitor 8 via the regulator 12 and the internal circuit power source terminal VDD on the basis of the input voltage VIN. The regulator 12 is connected between the starting constant current source 13 and the internal circuit power source terminal VDD. The regulator 12 and the capacitor 8 stabilize an internal circuit power source voltage Vdd generated between the internal circuit power source terminal VDD and the ground terminal GND to a predetermined voltage by virtue of a circuit current from the starting constant current source 13. Furthermore, the regulator 12 and the capacitor 8 supply the internal circuit power source voltage Vdd to various circuits contained in the switching control circuit 2.

The start control circuit 14 generates a start control signal S14 representing a signal for enabling/stopping the switching operation of the switching device 3 on the basis of the internal circuit power source voltage Vdd and outputs the signal to the three-input NAND circuit 21. In the case that the internal circuit power source voltage Vdd is less than a predetermined starting voltage, the start control circuit 14 drives the start control signal S14 low, thereby stopping the switching operation of the switching device 3. Furthermore, in the case that the internal circuit power source voltage Vdd is the predetermined starting voltage or more, the start control circuit 14 drives the start control signal S14 high, thereby enabling the switching operation of the switching device 3. In other words, in the case that the internal circuit power source voltage Vdd is less than the predetermined starting voltage, the start control circuit 14 controls the switching device 3 to a switching stopping state, and in the case that the internal circuit power source voltage Vdd is the predetermined starting voltage or more, the start control circuit 14 controls the switching device 3 to a switching enabling state.

The device current detection circuit 11 detects the magnitude of the device current ID flowing between the drain and the source of the switching device 3 and generates a device current detection signal ID_S representing a signal monotonically increasing signal with respect to the magnitude of the device current ID. The device current detection signal ID_S is also simply referred to as a current detection signal.

The input terminal of the target level setting circuit 15 is connected to the feedback signal input terminal FB, and the target level setting circuit 15 generates a target level signal IL_1 representing the target level of the device current detection signal ID_S on the basis of the feedback signal FB_S generated by the output voltage detection circuit 7. Reference code IL_1 designates a target level signal or a target level. In other words, the target level setting circuit 15 sets the target level IL_1 of the device current detection signal ID_S on the basis of the feedback signal FB_S.

The target level setting circuit 15 raises the target level IL_1 when the feedback signal FB_S becomes small, and lowers the target level IL_1 when the feedback signal FB_S becomes large. In other words, the target level setting circuit 15 raises the target level of the device current ID when the output voltage VOUT decreases, and lowers the target level of the device current ID when the output voltage VOUT increases. In addition, the target level setting circuit 15 limits the target level IL_1 to a predetermined limit level (described later) or less.

The device current detection signal ID_S is input to the non-inverting input terminal of the comparison circuit 16 for device current detection, and the target level signal IL_1 is input to the inverting input terminal thereof. The comparison circuit 16 for device current detection compares the level of the device current detection signal ID_S with the target level IL_1 and generates a comparison result signal OC_1 representing the result of the comparison. More specifically, when the level of the device current detection signal ID_S becomes the target level IL_1 or more, the comparison circuit 16 for device current detection switches the level of the comparison result signal OC_1 from low to high.

On the basis of the device current detection signal ID_S, the overcurrent detection circuit 23 detects an overcurrent state in the switching device 3 on the basis of the device current detection signal ID_S and generates an overcurrent detection signal OC. For example, if the level of the device current detection signal ID_S becomes a predetermined level or more, the overcurrent detection circuit 23 switches the level of the overcurrent detection signal OC from low to high.

On the basis of the overcurrent detection signal OC, the blanking adjustment circuit 24 generates an adjustment signal BLK_C representing a signal for adjusting the blanking period TBLK (shown in FIGS. 3 and 4 described later) of a blanking pulse signal BLK. More specifically, when the overcurrent detection signal OC rises from low to high, that is, when the overcurrent detection signal OC is generated, the blanking adjustment circuit 24 switches the level of the adjustment signal BLK_C from low to high, that is, generates the adjustment signal BLK_C. The adjustment signal BLK_C is also referred to as a nullification period adjustment signal. The blanking period TBLK is also referred to as a nullification period. The overcurrent detection circuit 23 and the blanking adjustment circuit 24 constitute a nullification period adjustment circuit. After detecting the overcurrent state of the switching device 3 on the basis of the device current detection signal ID_S, the nullification period adjustment circuit generates the adjustment signal BLK_C.

The blanking pulse generating circuit 17 generates the blanking pulse signal BLK representing a signal for nullifying the comparison result signal OC_1 during the blanking period TBLK on the basis of a drive signal DRIVE output from the three-input NAND circuit 21 and the adjustment signal BLK_C. The blanking pulse signal BLK is also referred to as a nullification signal. The blanking pulse generating circuit 17 sets the level of the blanking pulse signal BLK to low during the blanking period TBLK from a time point when the level of the drive signal DRIVE is changed from high to low, that is, generates the blanking pulse signal BLK. When the level of the drive signal DRIVE is switched from high to low, the switching device 3 is switched from the ON state to the OFF state (turned ON). Hence, the blanking period TBLK represents a period from a time point when the switching device 3 is turned ON.

The blanking pulse generating circuit 17 sets the blanking period TBLK to a predetermined ordinary period while the adjustment signal BLK_C is low, and sets the blanking period TBLK to an adjustment period shorter than the ordinary period while the adjustment signal BLK_C is high. In other words, when the adjustment signal BLK_C is generated, the blanking pulse generating circuit 17 shortens the blanking period TBLK. The state in which the blanking period TBLK is the ordinary period is referred to as an ordinary state, and the state in which the blanking period TBLK is the adjustment period is referred to as an adjustment state.

The AND circuit 18 generates a logical AND signal OFF_1 representing the logical AND of the comparison result signal OC_1 and the blanking pulse signal BLK. In the AND circuit 18, the logical AND signal OFF_1 becomes high when both the comparison result signal OC_1 and the blanking pulse signal BLK are high, and becomes low in the other cases. Hence, during the blanking period TBLK, that is, while the blanking pulse signal BLK is generated (while the blanking pulse signal BLK is low), the AND circuit 18 nullifies the comparison result signal OC_1 and maintains the logical AND signal OFF_1 low. Conversely, during periods other than the blanking period TBLK, the AND circuit 18 makes the logical AND signal OFF_1 coincide with the comparison result signal OC_1. The blanking pulse generating circuit 17 and the AND circuit 18 constitute a comparison result signal nullification circuit. The comparison result signal nullification circuit nullifies the comparison result signal OC_1 during the blanking period TBLK on the basis of the drive signal DRIVE, and shortens the blanking period TBLK when the adjustment signal BLK_C is generated.

The clock generating circuit 19 generates a clock signal CLOCK having a predetermined frequency and a maximum duty cycle signal MAXDC representing the maximum period in which the switching device 3 is in the ON state in one clock period. The clock signal CLOCK represents a pulse signal generated at a carrier frequency in the PWM method.

The clock signal CLOCK is input to the set terminal S of the flip-flop circuit 20 and the logical AND signal OFF_1 is input to the reset terminal R thereof, and the flip-flop circuit 20 performs an SR flip-flop operation, thereby generating a flip-flop signal S20 at the non-inverting output terminal Q thereof. The flip-flop circuit 20 sets the level of the flip-flop signal S20 high when the clock signal CLOCK is high and the logical AND signal OFF_1 is low, and sets the level of the flip-flop signal S20 low when the clock signal CLOCK is low and the logical AND signal OFF_1 is high. In other words, the flip-flop circuit 20 maintains the flip-flop circuit 20 high until the logical AND signal OFF_1 rises after the clock signal CLOCK has risen, and maintains the flip-flop signal S20 low until the clock signal CLOCK rises after the logical AND signal OFF_1 has risen. Still in other words, the flip-flop circuit 20 changes the level of the flip-flop signal S20 from low to high when the clock signal CLOCK rises periodically from low to high, and changes the level of the flip-flop signal S20 from high to low when the logical AND signal OFF_1 rises from low to high.

The three-input NAND circuit 21 generates the drive signal DRIVE representing the logical NAND of the three input signals, that is, the flip-flop signal S20, the maximum duty cycle signal MAXDC and the start control signal S14. The three-input NAND circuit 21 sets the level of the drive signal DRIVE low when all the flip-flop signal S20, the maximum duty cycle signal MAXDC and the start control signal S14 are high, and sets the level of the drive signal DRIVE high in the other cases.

The gate driver 22 generates the control signal S4 representing the logical NOT of the drive signal DRIVE.

The switching device 3 is in the ON state when the control signal S4 is high, and is in the OFF state when the control signal S4 is low. In other words, the switching device 3 is in the ON state when the drive signal DRIVE is low, and is in the OFF state when the drive signal DRIVE is high.

The state of the control signal S4 described above is divided into a fundamental state and an exceptional state, and described below. In the fundamental state, the blanking pulse signal BLK, the start control signal S14 and the maximum duty cycle signal MAXDC are all assumed to be high. In this case, when the clock signal CLOCK rises periodically from low to high, the drive signal lowers from high to low, and the switching device 3 is switched from the OFF state to the ON state (turned ON). On the other hand, when the level of the device current detection signal ID_S becomes the target level IL_1 or more and the comparison result signal OC_1 is generated, the drive signal rises from low to high, and the switching device 3 is switched from the ON state to the OFF state (turned OFF).

Next, the exceptional state will be described below.

Firstly, in the case that the blanking pulse signal BLK is low, the comparison result signal OC_1 is nullified. Hence, the switching device 3 is not switched to the OFF state (not turned OFF) even if the level of the device current detection signal ID_S becomes the target level IL_1 or more in the blanking period TBLK. This prevents a malfunction in which the switching device 3 is turned OFF by a spike-like device current generated when the switching device 3 is turned ON.

After turned ON, the switching device 3 eliminates the spike-like device current generated initially and increases the device current ID monotonically. If the level of the device current detection signal ID_S does not reach the target level IL_1 until the completion time point of the blanking period TBLK after the time point when the switching device 3 was turned ON, the switching device 3 is turned OFF at the time point when the level of the device current detection signal ID_S has reached the target level IL_1 as in the above-mentioned fundamental state. On the other hand, if the level of the device current detection signal ID_S reaches the target level IL_1 until the completion time point of the blanking period TBLK, the switching device 3 is turned OFF at the completion time point of the blanking period TBLK.

Secondly, in the case that the start control signal S14 is low, the internal circuit power source voltage Vdd is less than the predetermined starting voltage, and the switching operation of the switching device 3 is stopped as described above. This prevents the switching control circuit 2 from malfunctioning when the internal circuit power source voltage Vdd is insufficient.

Thirdly, the maximum duty cycle signal MAXDC will be described below. The maximum duty cycle signal MAXDC rises from low to high in synchronization with the clock signal CLOCK in a given clock period of the clock signal CLOCK, and changes from high to low before this clock period ends (before the clock signal CLOCK rises in the next clock period). In the case that the level of the device current detection signal ID_S becomes the target level IL_1 or more after the ON period of the switching device 3 became longer and the maximum duty cycle signal MAXDC became low, the switching device 3 is turned OFF at the time point when the maximum duty cycle signal MAXDC becomes low. As a result, the ON period of the switching device 3 is limited to the high level period of the maximum duty cycle signal MAXDC.

As described above, the switching power source apparatus achieves the current mode PWM control in which the output voltage VOUT is stabilized to a predetermined voltage by controlling the peak value of the device current ID.

Figure 2:
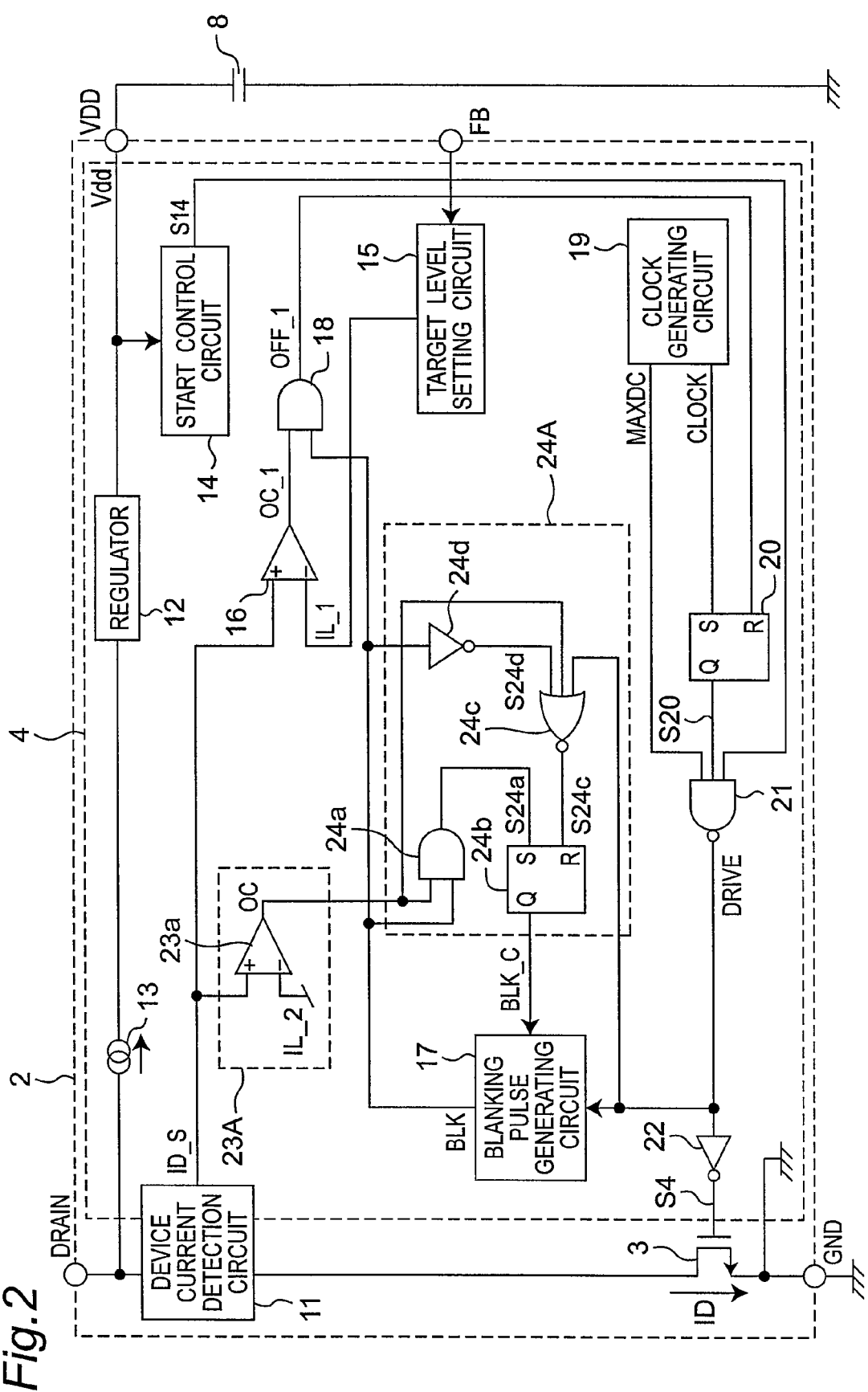
FIG. 2 is a block diagram showing a configuration example of a switching control circuit according to Embodiment 1 of the present invention.

FIG. 2 is a block diagram showing a more specific configuration example of the switching control circuit according to Embodiment 1 being used in the switching power source apparatus shown in FIG. 1.

The overcurrent detection circuit 23A shown in FIG. 2 contains a comparison circuit 23a for overcurrent detection. A limit level IL_2 is set so as to be higher than the target level IL_1. The comparison circuit 23a for overcurrent detection compares the level of the device current detection signal ID_S with the limit level IL_2 and generates the overcurrent detection signal OC representing the result of the comparison.

More specifically, when the level of the device current detection signal ID_S becomes the limit level IL_2 or more, the overcurrent detection circuit 23A detects the overcurrent state of the switching device 3 and switches the level of the overcurrent detection signal OC from low to high.

In addition, a blanking adjustment circuit 24A outputs the adjustment signal BLK_C for adjusting the pulse period of the blanking pulse signal BLK depending on the overcurrent detection signal OC output from the overcurrent detection circuit 23A. The blanking adjustment circuit 24A contains an AND circuit 24a, a NOT circuit 24d, a three-input NOR circuit 24c, and a flip-flop circuit 24b.

In the AND circuit 24a, a logical AND signal S24a becomes high when both the overcurrent detection signal OC and the blanking pulse signal BLK are high, and becomes low in the other cases. On the other hand, the NOT circuit 24d inverts the blanking pulse signal BLK and generates an inverted blanking pulse signal 24d. In the three-input NOR circuit 24c, a logical NOR signal S24c becomes high when all the three signals, that is, the drive signal DRIVE, the overcurrent detection signal OC and the inverted blanking pulse signal 24d, are low, and becomes low in the other cases.

The flip-flop circuit 24b maintains the adjustment signal BLK_C output from the Q terminal thereof high until the logical NOR signal S24c input to the R terminal thereof becomes high after the logical AND signal S24c input to the S terminal thereof became high. Furthermore, the flip-flop circuit 24b maintains the adjustment signal BLK_C low until the logical AND signal S24a becomes high after the logical NOR signal S24c became high. In other words, in the flip-flop circuit 24b, the adjustment signal BLK_C becomes high when the logical AND signal S24a becomes high, and becomes low when the logical NOR signal 24c becomes high.

As described above, the blanking pulse generating circuit 17 sets the blanking period TBLK of the blanking pulse signal BLK to the adjustment period shorter than the ordinary period when the adjustment signal BLK_C is high, and sets the blanking period TBLK to the ordinary period when the adjustment signal BLK_C is low.

The operation of the switching power source apparatus configured as described above will be described below referring to FIGS. 1 to 4.

In FIG. 1, the DC voltage VIN is applied across the input terminals IN1 and IN2. The DC voltage VIN is generated, for example, by rectifying and smoothing commercial AC power. In the switching stopping state immediately after the input DC voltage VIN was applied, the regulator 12 supplies a current from the drain terminal DRAIN to the capacitor 8 operating as an internal circuit power source via the internal circuit power source terminal VDD and raises the internal circuit power source voltage Vdd.

Then, the internal circuit power source voltage Vdd is input to the start control circuit 14. When the internal circuit power source voltage Vdd reaches a predetermined starting voltage VDDON, the start control circuit 14 switches the level of the start control signal S14 from low to high. The starting voltage VDDON is set so that, after the internal circuit power source voltage Vdd has reached the starting voltage VDDON, all the circuits contained in the switching control circuit 2 become operational sufficiently. In addition, when the internal circuit power source voltage Vdd reaches the starting voltage VDDON, the clock generating circuit 19 outputs the clock signal CLOCK and the maximum duty cycle signal MAXDC. As a result, the switching operation of the switching device 3 starts and the switching enabling state is obtained.

After the start of the switching operation of the switching device 3, the regulator 12 continues to supply the current to the capacitor 8 via the internal circuit power source terminal VDD, thereby stabilizing the internal circuit power source voltage Vdd at the predetermined voltage.

Furthermore, if the internal circuit power source voltage Vdd lowers to a predetermined stop voltage VDDOFF for some reason in the switching enabling state, the start control circuit 14 switches the level of the start control signal S14 from high to low to stop the switching operation of the switching device 3, thereby setting the switching device 3 to the switching stopping state.

When the switching operation of the switching device 3 starts, an AC voltage is induced in the secondary winding 1b of the switching transformer 1, and the output voltage generating circuit 5 supplies the output voltage VOUT to the load 6 connected across the output terminals OUT1 and OUT2.

The output voltage detection circuit 7 detects the output voltage VOUT and generates the feedback signal FB_S depending on the voltage level of the output voltage VOUT. The control circuit 4 controls the switching operation of the switching device 3 on the basis of the feedback signal FB_S and stabilizes the output voltage VOUT to a predetermined voltage.

Figure 3:
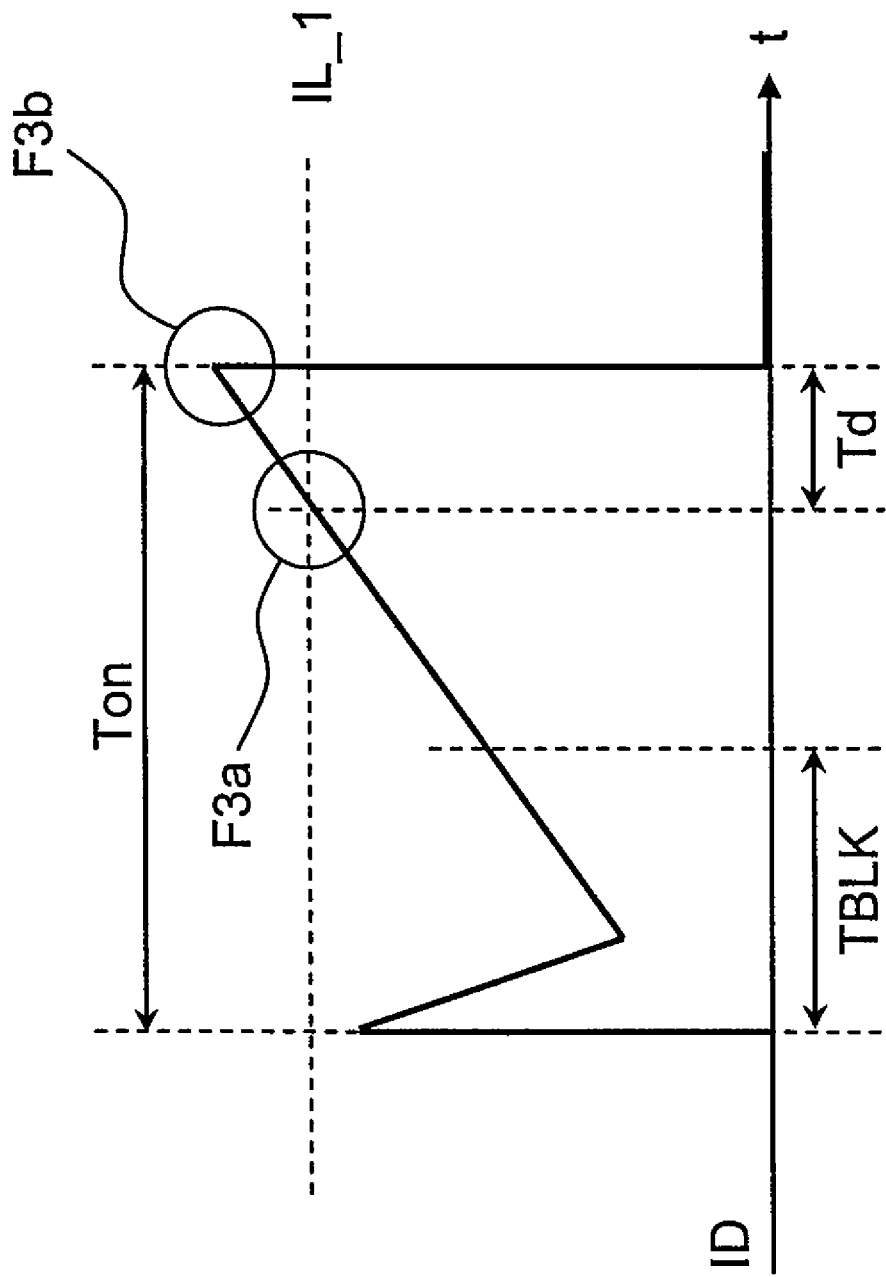
FIG. 3 is a waveform diagram showing the waveform of a device current in the steady operation state of the switching power source apparatus according to Embodiment 1 of the present invention.

The switching enabling state can be divided into a steady state in which the output voltage VOUT is stabilized to the predetermined voltage and a non-steady state in which the output voltage VOUT is low and unstable as in the starting time and an overload time. As shown in FIG. 3, in the steady state, the ON period Ton of the switching operation is longer than a minimum ON period Tonmin represented by the sum of the blanking period TBLK and a delay time Td. Hence, the device current ID is limited by the target level IL_1. If the device current ID reaches the target level IL_1 as shown in a waveform portion F3a, the switching device 3 is turned OFF after the predetermined delay time Td as shown in a waveform portion F3b.

On the other hand, in the non-steady state, the ON period Ton of the switching operation becomes short, and the device current ID reaches the target level IL_1 in the blanking period TBLK. In this case, in the blanking period TBLK, the blanking pulse generating circuit 17 nullifies the comparison result signal OC_1 using the blanking pulse signal BLK. For this reason, even if the device current ID reaches the target level IL_1, the switching device 3 is not turned OFF immediately. The switching device 3 is turned OFF after the blanking period TBLK has expired and the delay time Td has passed. In other words, in this case, the ON period Ton of the switching device 3 becomes the minimum ON period Tonmin.

If the ON period Ton of the switching device 3 becomes short to the minimum ON period Tonmin as described above, current limitation depending on the target level IL_1 does not work in the comparison circuit 16 for current detection. Hence, the level of the device current ID becomes larger than the target level IL_1. In some cases, an overcurrent state occurs in which the device current ID reaches the limit level IL_2 in the comparison circuit 23a for overcurrent detection.

Figure 4:
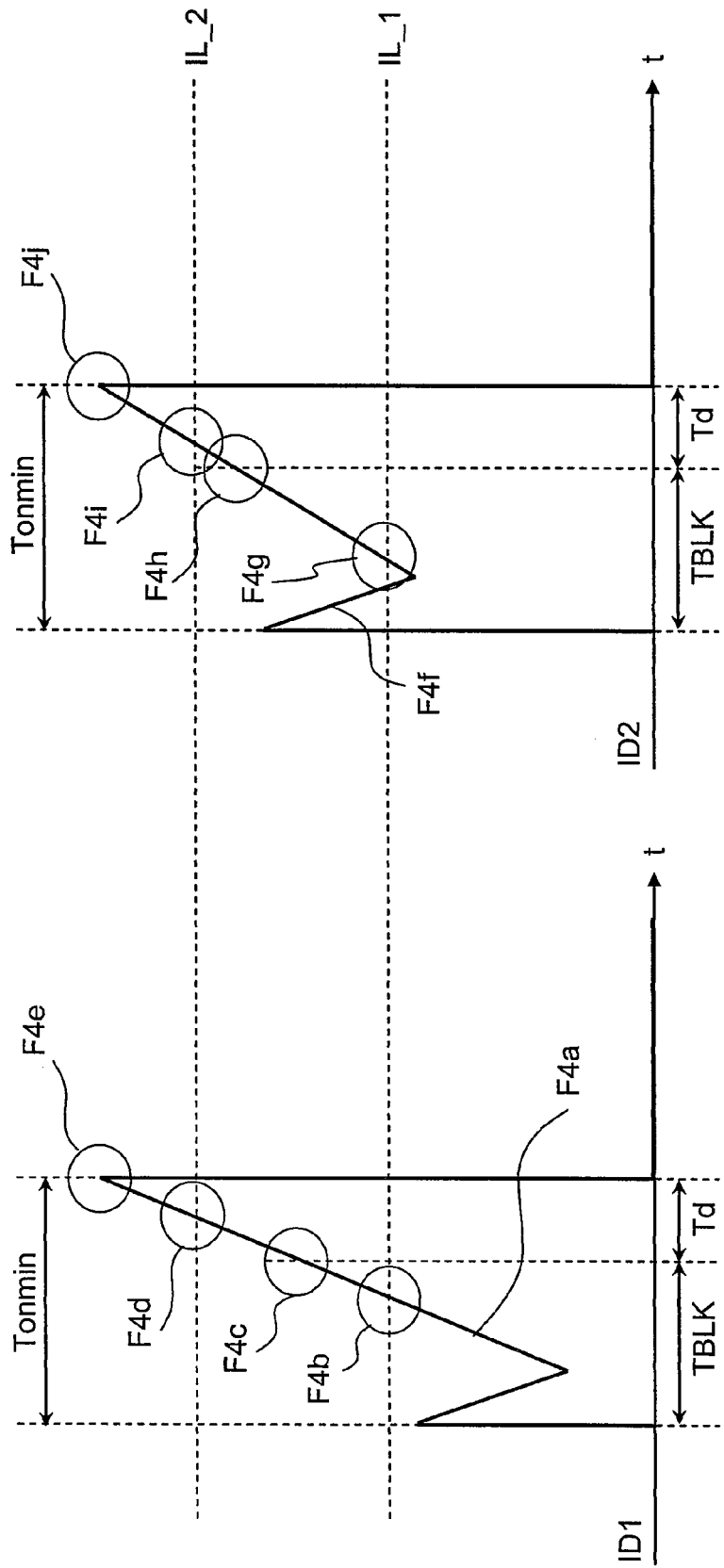
FIG. 4 is a waveform diagram showing the waveform of the device current in the overcurrent state of the switching power source apparatus according to Embodiment 1 of the present invention.

FIG. 4 is a waveform diagram showing an example of the waveform of the device current ID in the overcurrent state. In the case of a device current ID1, the rate of current increase is high, and the inclination of its waveform is large as shown in a waveform F4a. On the other hand, in the case of a device current ID2, the energy stored in the switching transformer 1 when the switching device 3 is turned ON is large, and the initial current of the device current is large as shown in a waveform F4f.

Although the device current ID1 reaches the target level IL_1 at a waveform portion F4b, current limitation does not work in the blanking period TBLK. At a waveform portion F4c at the completion time point of the blanking period TBLK, current limitation depending on the target level IL_1 works. Then, the switching device 3 is turned OFF at a waveform portion F4e after the delay time Td has passed after the completion time point of the blanking period TBLK. However, the device current ID1 reaches the limit level IL_2 at a waveform portion F4d in the delay time Td, and the overcurrent state of the switching device 3 occurs. Similarly, although the device current ID2 reaches the target level IL_1 at a waveform portion F4g, current limitation does not work in the blanking period TBLK. At a waveform portion F4h at the completion time point of the blanking period TBLK, current limitation depending on the target level IL_1 works. Then, the switching device 3 is turned OFF at a waveform portion F4j after the delay time Td has passed after the completion time point of the blanking period TBLK. However, the device current ID2 reaches the limit level IL_2 at a waveform portion F4i in the delay time Td, and the overcurrent state of the switching device 3 occurs.

Figure 5:
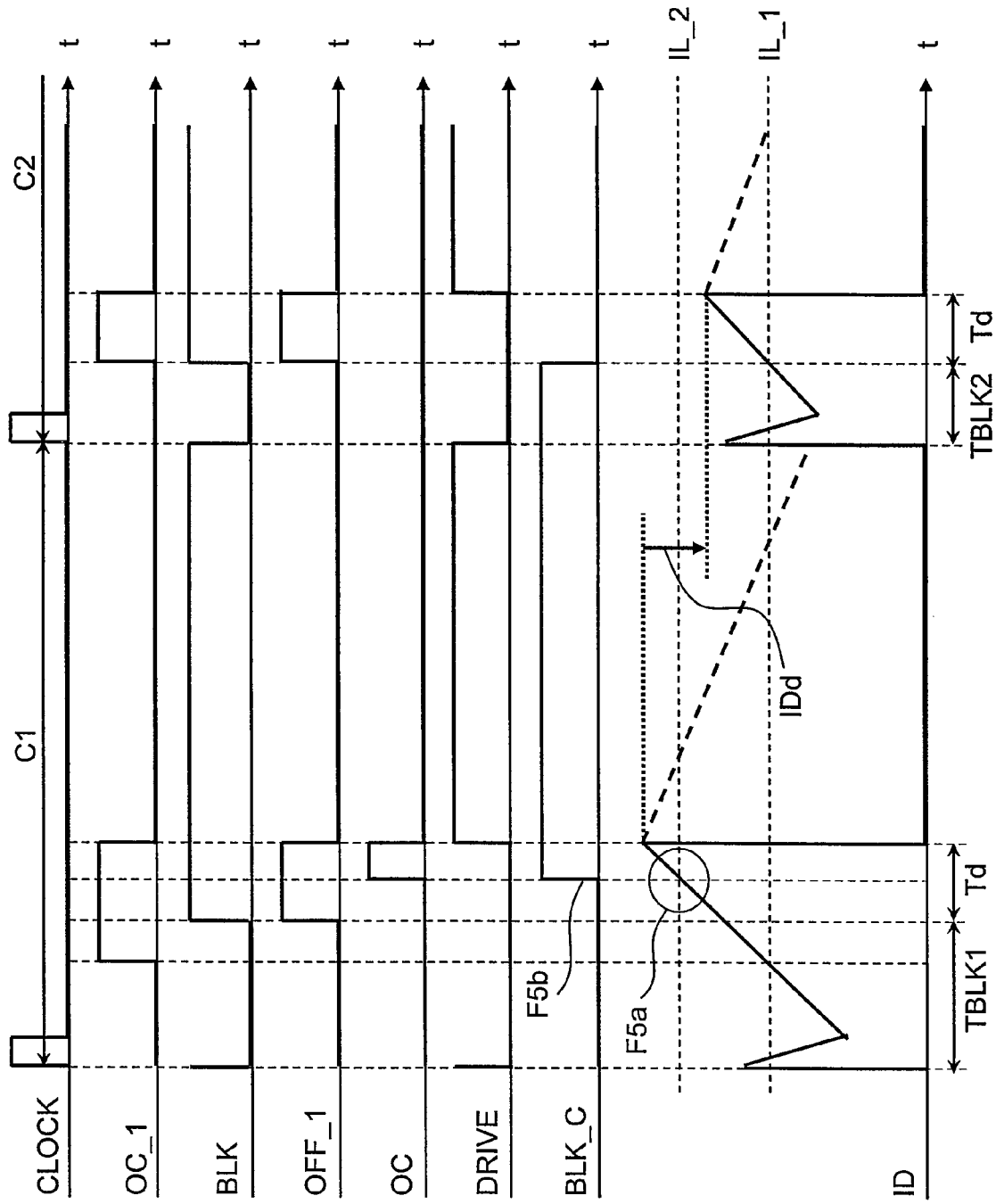
FIG. 5 is a timing chart showing timing when overcurrent protection is activated in the switching power source apparatus according to Embodiment 1 of the present invention.

FIG. 5 is a timing chart showing timing when the overcurrent state of the switching device 3 is detected and the ON period Ton becomes short in the switching power source apparatus in which the switching control circuit 2 shown in FIG. 2 is used. The operation of the switching control circuit 2 will be described below referring to FIGS. 2 to 5.

In a clock period C1 in FIG. 5, the ON period Ton of the switching device 3 is shortened to the minimum ON period Tonmin that is represented by the sum of a blanking period TBLK1 (ordinary period) and the delay time Td. When the device current ID reaches the limit level IL_2 as shown in a waveform portion F5a, the overcurrent detection circuit 23A detects the overcurrent state of the switching device 3 and switches the level of the overcurrent detection signal OC from low to high. The overcurrent detection circuit 23A maintains the overcurrent detection signal OC high until the switching device 3 is turned OFF. At this time, if the blanking pulse signal BLK is high, the logical AND signal S24a of the AND circuit 24a becomes high. The flip-flop circuit 24b is set by the logical AND signal S24a and switches the level of the adjustment signal BLK_C from low to high as shown in a waveform portion F5b.

When the adjustment signal BLK_C becomes high, the blanking pulse generating circuit 17 generates the blanking pulse signal BLK in the adjustment period shorter than the ordinary period in the next clock period C2. As a result, when the overcurrent detection circuit 23A detects the overcurrent state, a blanking period TBLK2 (adjustment period) in the clock period C2 becomes shorter than the blanking period TBLK1 (ordinary period). Hence, the timing at which current limitation by the comparison circuit 16 for device current detection works after the switching device 3 was turned ON becomes earlier than the timing at which the overcurrent state is detected, whereby the ON period Ton of the switching device 3 becomes short.

As described above, the switching control circuit according to Embodiment 1 can detect the overcurrent state of the switching device 3 and can shorten the ON period Ton in the clock period C2 next to the clock period C1 in which the overcurrent was detected. As a result, the device current ID can be made smaller by a device current change value IDd in each pulse for the switching operation, and increase in the device current ID each time a pulse is generated can be suppressed. Therefore, the device current ID can be prevented from becoming large and reaching the allowable current value of the switching device 3 or more, and overcurrent protection for protecting the switching device 3 from being degraded and damaged can be achieved.

If the blanking period TBLK becomes short by virtue of the overcurrent protection and the state in which the ON period Ton of the switching device 3 is short is maintained, the energy required to raise the output voltage VOUT to the predetermined voltage is not obtained at the starting time, for example. As a result, an improper starting state in which the power source cannot be started may occur. Hence, in the case that the level of the device current ID becomes smaller than the limit level IL_2 as shown in FIG. 5 and the overcurrent state is resolved by the activation of the overcurrent protection, it is necessary to cancel the overcurrent protection.

Figure 6:
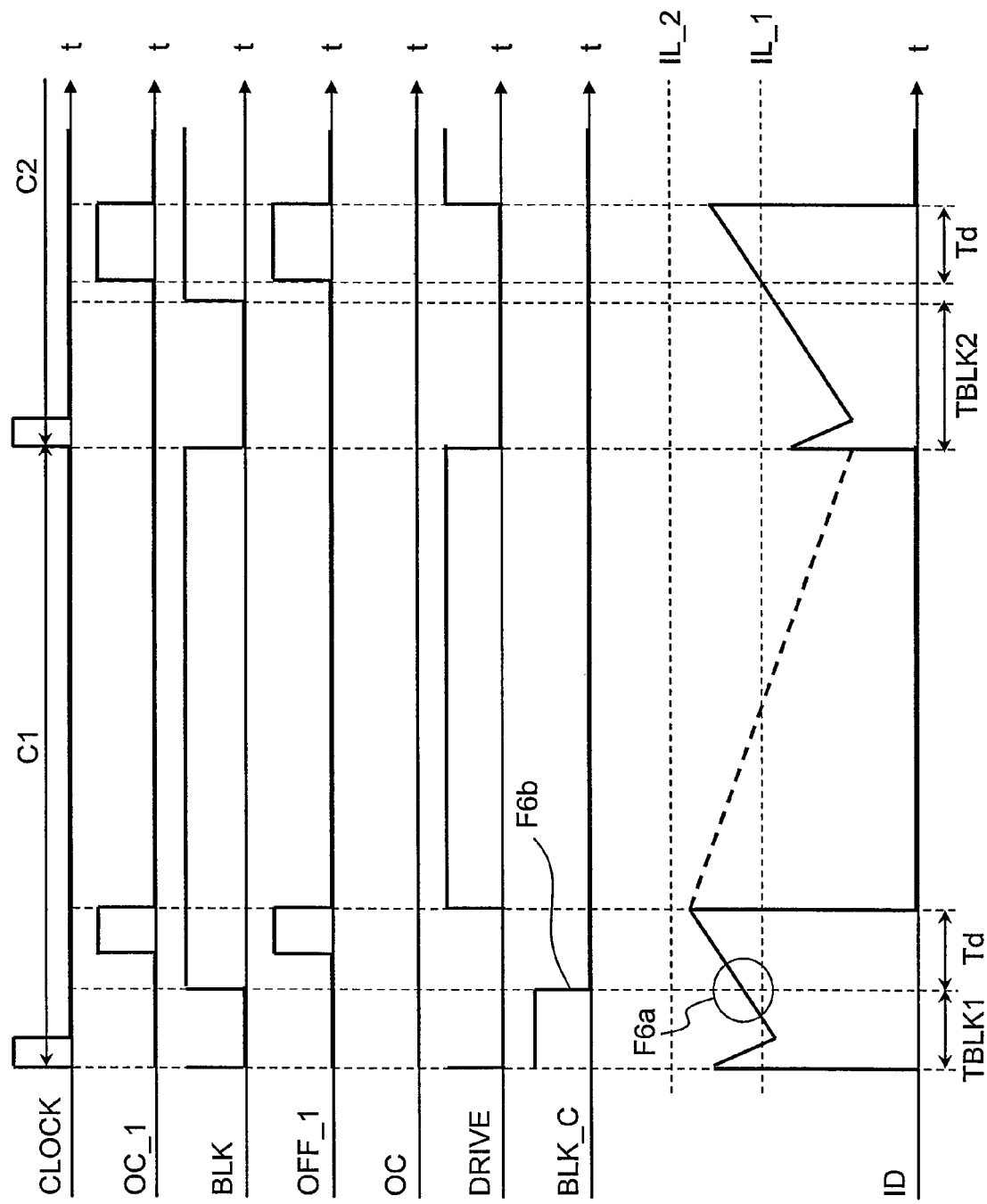
FIG. 6 is a timing chart showing timing when overcurrent protection is canceled in the switching power source apparatus according to Embodiment 1 of the present invention.

FIG. 6 is a timing chart showing timing when the level of the device current ID becomes smaller than the limit level IL_2 by virtue of the overcurrent protection, that is, the overcurrent state is resolved and the overcurrent protection is canceled. An operation in a case in which, after the overcurrent protection for the switching device 3 was activated, the device current ID becomes smaller than the limit level IL_2, that is, the overcurrent state is resolved, will be described below referring to FIGS. 2 and 6.

In a clock period preceding the clock period C1 by at least one clock, it is assumed that the overcurrent protection for the switching device 3 worked and the adjustment signal BLK_C became high. In this case, at the starting time point of the clock period C1, the blanking pulse generating circuit 17 is controlled using the blanking adjustment circuit 24A so as to generate the blanking pulse signal BLK1 having the adjustment period shorter than the ordinary period. When the clock generating circuit 19 outputs the clock signal CLOCK in this state, the three-input NAND circuit 21 switches the level of the drive signal DRIVE from high to low, thereby turning ON the switching device 3. After the short blanking period TBLK1, the blanking pulse generating circuit 17 switches the level of the blanking pulse signal BLK from low to high. As a result, an inverted blanking pulse signal S24d becomes low. In addition, since the overcurrent protection is activated, the level of the device current ID becomes smaller than the limit level IL_2 as shown in a waveform portion F6a after the completion time point of the blanking period TBLK1 in the clock period C1. As a result, the overcurrent detection circuit 23A drives the overcurrent detection signal OC low, thereby stopping the generation of the overcurrent detection signal OC.

As described above, all the three input signals of the three-input NOR circuit 24c become low, and the output signal of the three-input NOR circuit 24c, that is, the logical NOR signal S24c, becomes high. As a result, the flip-flop circuit 24b is reset by the logical NOR signal S24c and switches the level of the adjustment signal BLK_C from high to low as shown in a waveform portion F6b. In other words, the blanking adjustment circuit 24A stops the generation of the adjustment signal BLK_C. As described above, when the generation of the adjustment signal BLK_C is stopped, the blanking adjustment circuit 24A stops the generation of the adjustment signal BLK_C. When the adjustment signal BLK_C is low, the blanking pulse generating circuit 17 is controlled so as to generate the blanking pulse signal BLK having the ordinary period, whereby the overcurrent protection is canceled.

As described above, in the switching control circuit according to Embodiment 1, in the case that the overcurrent protection state is resolved, the overcurrent protection is canceled, and the length of the blanking period TBLK can be returned to the length of the ordinary period in the clock period C2 next to the clock period C1 in which the overcurrent protection was canceled. Hence, the improper starting state at the starting time can be prevented, for example.

In the overcurrent protection performed in the switching power source apparatus in which the switching control circuit 2 shown in FIG. 2 is used, even if an overcurrent state is detected again after the overcurrent protection was canceled once, the overcurrent protection is activated immediately, and the blanking period TBLK of the ON pulse next to the pulse in which the overcurrent state was detected can be shortened.

Therefore, the switching power source apparatus according to Embodiment 1 performs overcurrent protection based on the so-called pulse-by-pulse detection in which an overcurrent state is detected in each pulse for the switching operation and overcurrent protection is activated.

Embodiment 2

In the following description of Embodiment 2, differences from Embodiment 1 will be mainly described. Since the configurations, operations and effects other than those relating to the differences are similar to those according to Embodiment 1, their descriptions are omitted.

Figure 7:
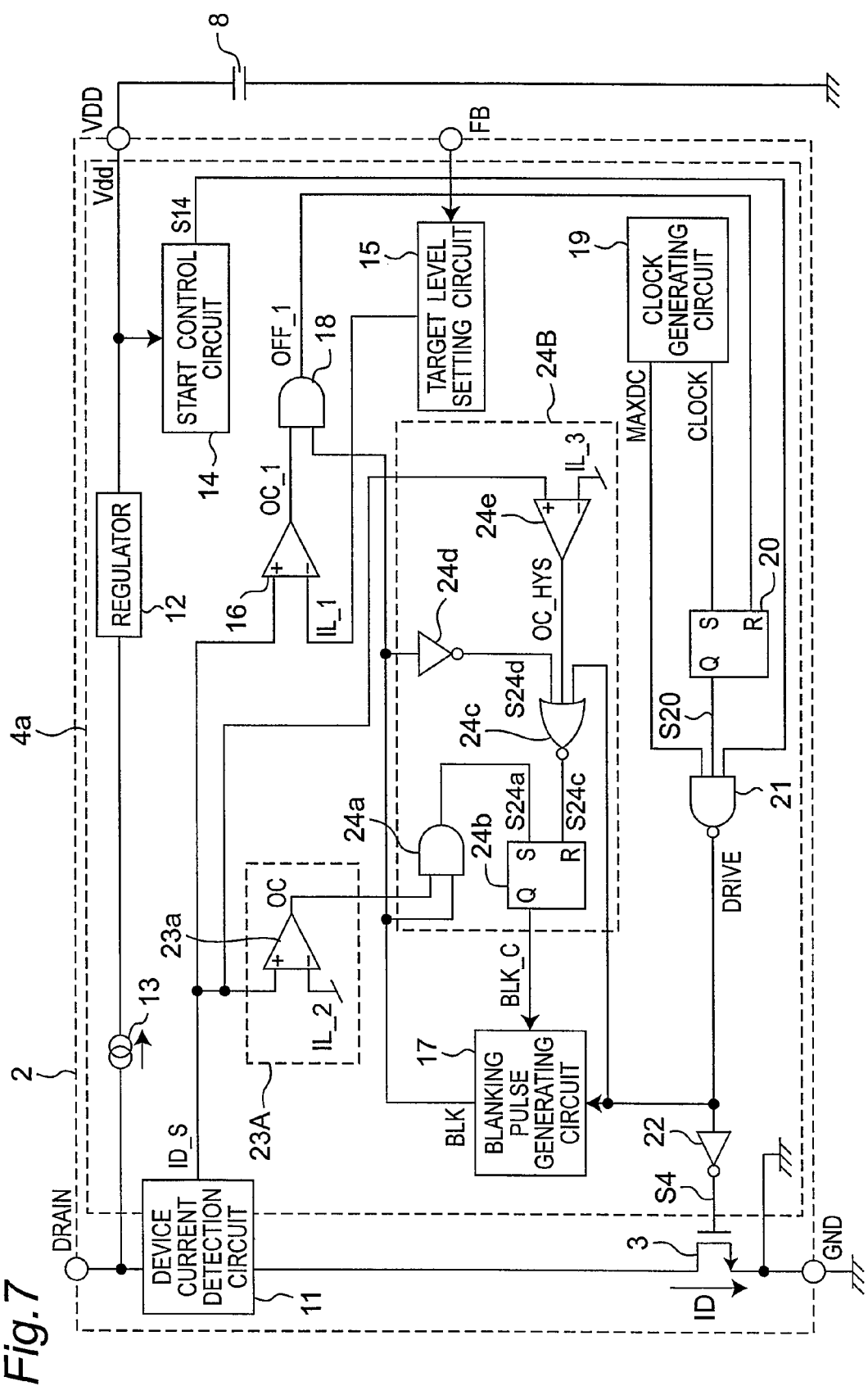
FIG. 7 is a block diagram showing a configuration example of a switching control circuit according to Embodiment 2 of the present invention.

FIG. 7 is a block diagram showing a configuration example of a switching control circuit according to Embodiment 2. In FIG. 7, a control circuit 4a differs from the control circuit 4 according to Embodiment 1 in that a blanking adjustment circuit 24B inside the control circuit 4a contains a comparison circuit 24e for overcurrent resolution and that the three-input NOR circuit 24c uses the output signal of the comparison circuit 24e for overcurrent resolution instead of the overcurrent detection signal OC.

The comparison circuit 24e for overcurrent resolution compares the level of the device current detection signal ID_S with a limit level IL_3 lower than the limit level IL_2 and generates a comparison result signal OC_HYS. The comparison circuit 24e for overcurrent resolution drives the comparison result signal OC_HYS high when the level of the device current ID is the limit level IL_3 or more, and drives the comparison result signal OC_HYS low when the level of the device current ID is less than the limit level IL_3. In the three-input NOR circuit 24c, the logical NOR signal S24c becomes high when all the drive signal DRIVE, the comparison result signal OC_HYS and the inverted blanking pulse signal S24d are low, and becomes low in the other cases.

Figure 8:
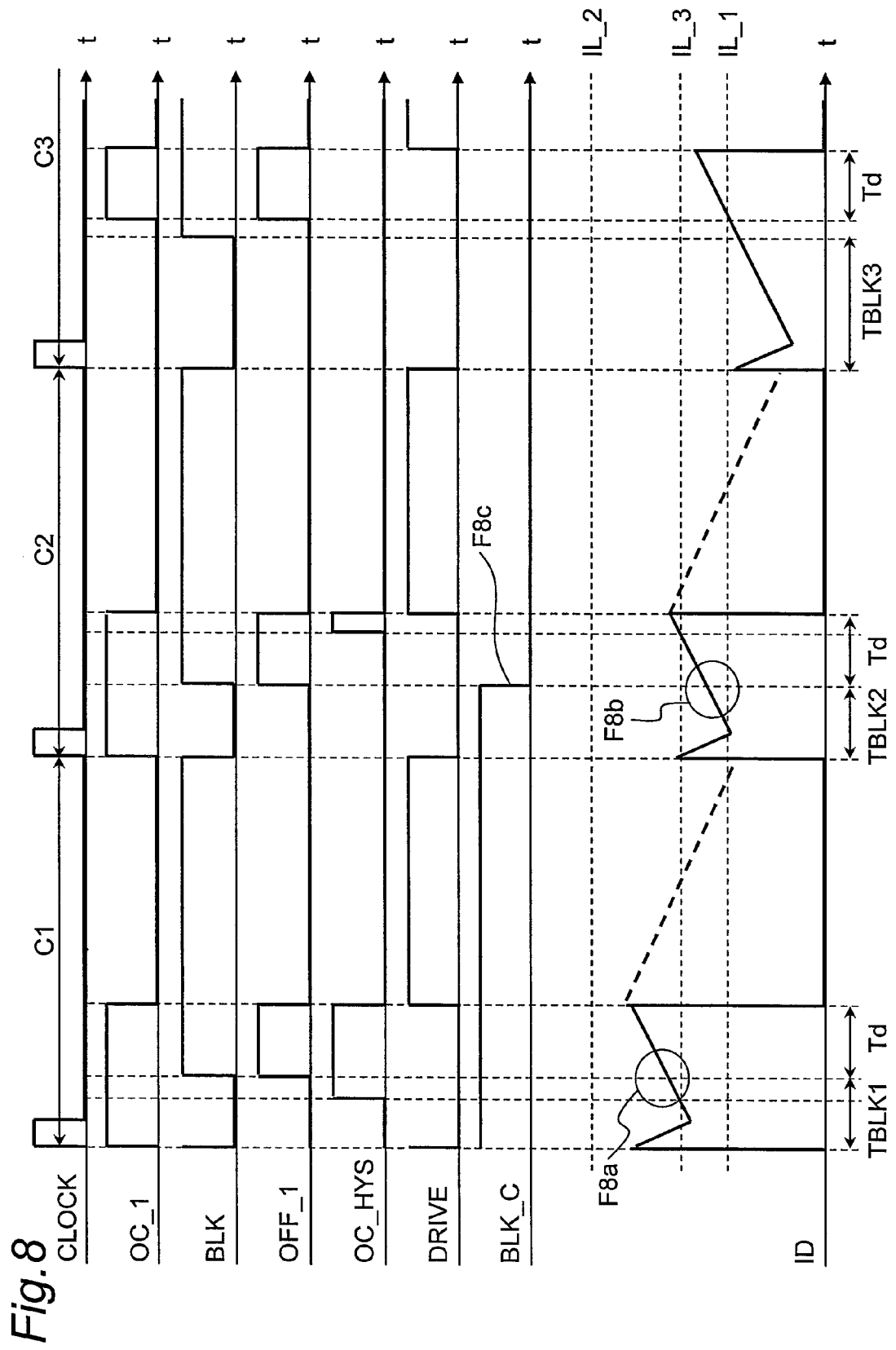
FIG. 8 is a timing chart showing timing when overcurrent protection is canceled in a switching power source apparatus according to Embodiment 2 of the present invention.

FIG. 8 is a timing chart showing timing when the level of the device current ID becomes smaller than the limit level IL_3 by virtue of the overcurrent protection and the overcurrent protection is canceled. The operation of the control circuit 4a according to Embodiment 2 will be described below referring to FIGS. 7 and 8.

In a clock period preceding the clock period C1 by at least one clock, when it is assumed that the ON period Ton of the switching operation became short to the minimum ON period Tonmin and the level of the device current ID reached the limit level IL_2. At this time, the overcurrent detection circuit 23A detects the overcurrent state of the switching device 3, the overcurrent protection for the switching device 3 is activated by an operation similar to that described in Embodiment 1, and the adjustment signal BLK_C becomes high.

In this case, at the starting time point of the clock period C1, the blanking pulse generating circuit 17 is controlled using the blanking adjustment circuit 24B so as to generate the blanking pulse signal BLK1 having the adjustment period shorter than the ordinary period. When the clock generating circuit 19 outputs the clock signal CLOCK in this state, the three-input NAND circuit 21 switches the level of the drive signal DRIVE from high to low, thereby turning ON the switching device 3. After the short blanking period TBLK1, the blanking pulse generating circuit 17 switches the level of the blanking pulse signal BLK from low to high. As a result, the inverted blanking pulse signal S24d becomes low. As described above, two of the three input signals input to the three-input NOR circuit 24c, that is, the drive signal DRIVE and the inverted blanking pulse signal S24d, become low.

Since the overcurrent protection has been activated, the level of the device current ID becomes smaller than the limit level IL_2 at the completion time point of the blanking period TBLK1 of the clock period C1 but is still larger than the limit level IL_3 as shown in a waveform portion F8a, whereby the comparison result signal OC_HYS is high. Hence, in the clock period C1, the adjustment signal BLK_C remains high, and the blanking adjustment circuit 24B continues to control the blanking pulse signal BLK so that the blanking period TBLK becomes short. The overcurrent protection is thus not canceled.

Next, when the level of the device current ID becomes further smaller and becomes smaller than the limit level IL_3 as shown in a waveform portion F8b in the clock period C2, the comparison result signal OC_HYS becomes low, and all the three input signals of the three-input NOR circuit 24e become low. Hence, the blanking adjustment circuit 24B switches the level of the adjustment signal BLK_C from high to low as shown in a waveform portion F8c, thereby stopping the generation of the adjustment signal BLK_C. In other words, the blanking adjustment circuit 24B stops the generation of the adjustment signal BLK_C when the level of the device current detection signal ID_S becomes less than the limit level IL_3. As a result, the overcurrent protection is canceled. Hence, in a clock period C3, the length of the blanking period TBLK3 returns to the length of the ordinary period.

As described above, in the switching control circuit according to Embodiment 2, by the use of the configuration provided with the limit level IL_3 other than the limit level IL_2 that is used for the overcurrent detection, hysteresis can be provided for the overcurrent detection level (the limit level IL_2) and the overcurrent protection cancellation level (the limit level IL_3) of the device current ID. With the configuration, the overcurrent protection is canceled after the level of the device current ID has become small to the overcurrent protection cancellation level. Hence, the switching device can be prevented more securely from being degraded and damaged, and highly reliable overcurrent protection can be achieved.

The limit level IL_3 can be set to a given level, provided that the level is lower than the limit level IL_2 and may be set to the same level as the target level IL_1. Furthermore, an effect similar to that described above is also obtained even in a configuration in which the comparison circuit 24e for overcurrent resolution compares the level of the device current detection signal ID_S with the target level IL_1 and generates the comparison result signal OC_HYS.

Embodiment 3

In the following description of Embodiment 3, differences from Embodiments 1 and 2 will be mainly described. Since the configurations, operations and effects other than those relating to the differences are similar to those according to Embodiments 1 and 2, their descriptions are omitted.

Figure 9:
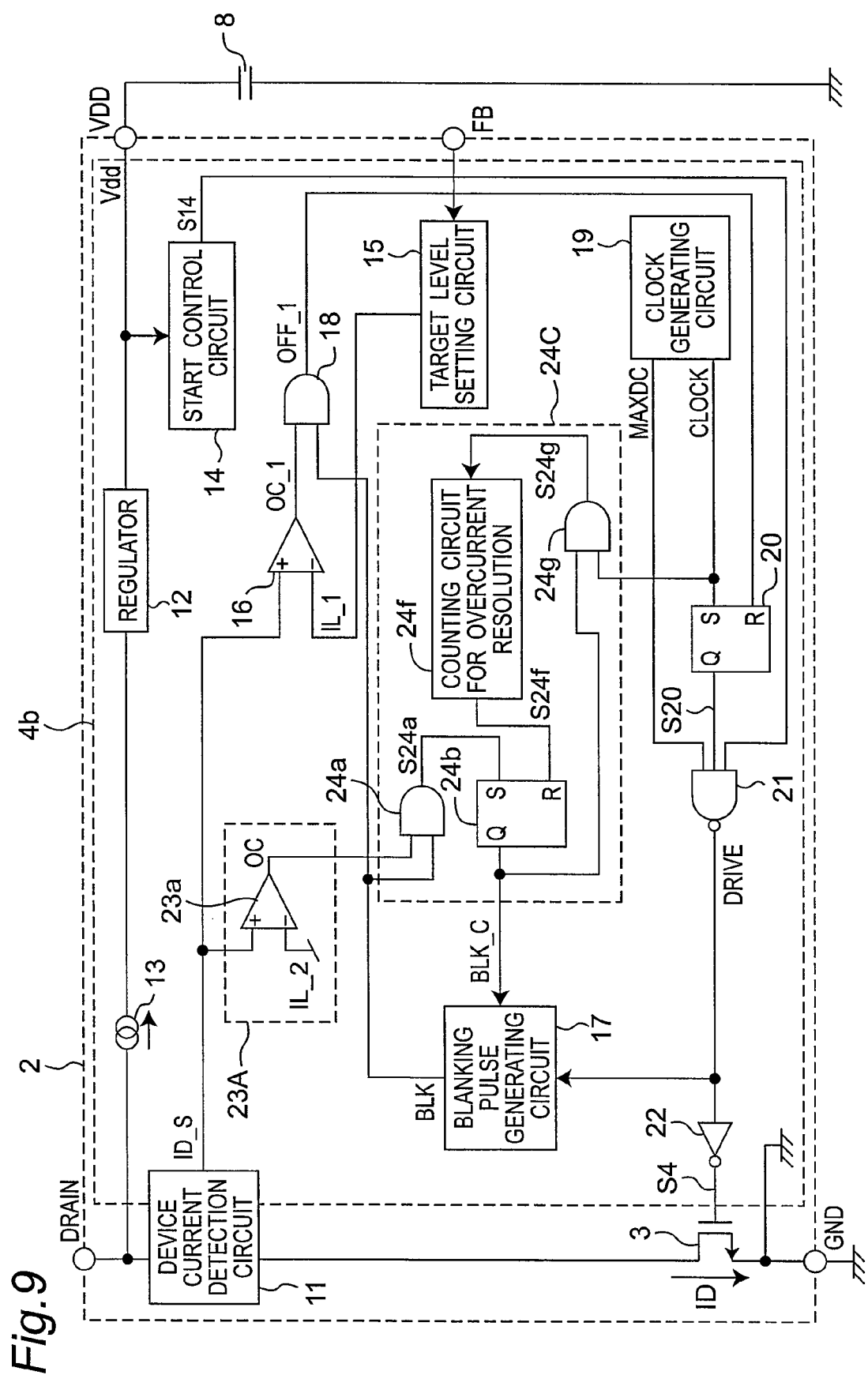
FIG. 9 is a block diagram showing a configuration example of a switching control circuit according to Embodiment 3 of the present invention.

FIG. 9 is a block diagram showing a configuration example of a switching control circuit according to Embodiment 3. In FIG. 9, the configuration of a control circuit 4b differs from those of the control circuits according to Embodiment 1 and 2 in that a blanking adjustment circuit 24C inside the control circuit 4b contains an AND circuit 24g and a counting circuit 24f for overcurrent resolution and that the AND circuit 24g and the counting circuit 24f for overcurrent resolution are used to reset the flip-flop circuit 24b.

In the AND circuit 24g, the logical AND signal S24g thereof becomes high when both the adjustment signal BLK_C and the clock signal CLOCK are high, and becomes low in the other cases. When the level of the logical AND signal S24g is switched from low to high, the counting circuit 24f for overcurrent resolution starts counting and counts the number of the rising edges (from low to high) of the signal. When the count value reaches a predetermined maximum count value, the counting circuit 24f for overcurrent resolution switches the level of the count signal S24f thereof from low to high and then resets the count value.

Figure 10:
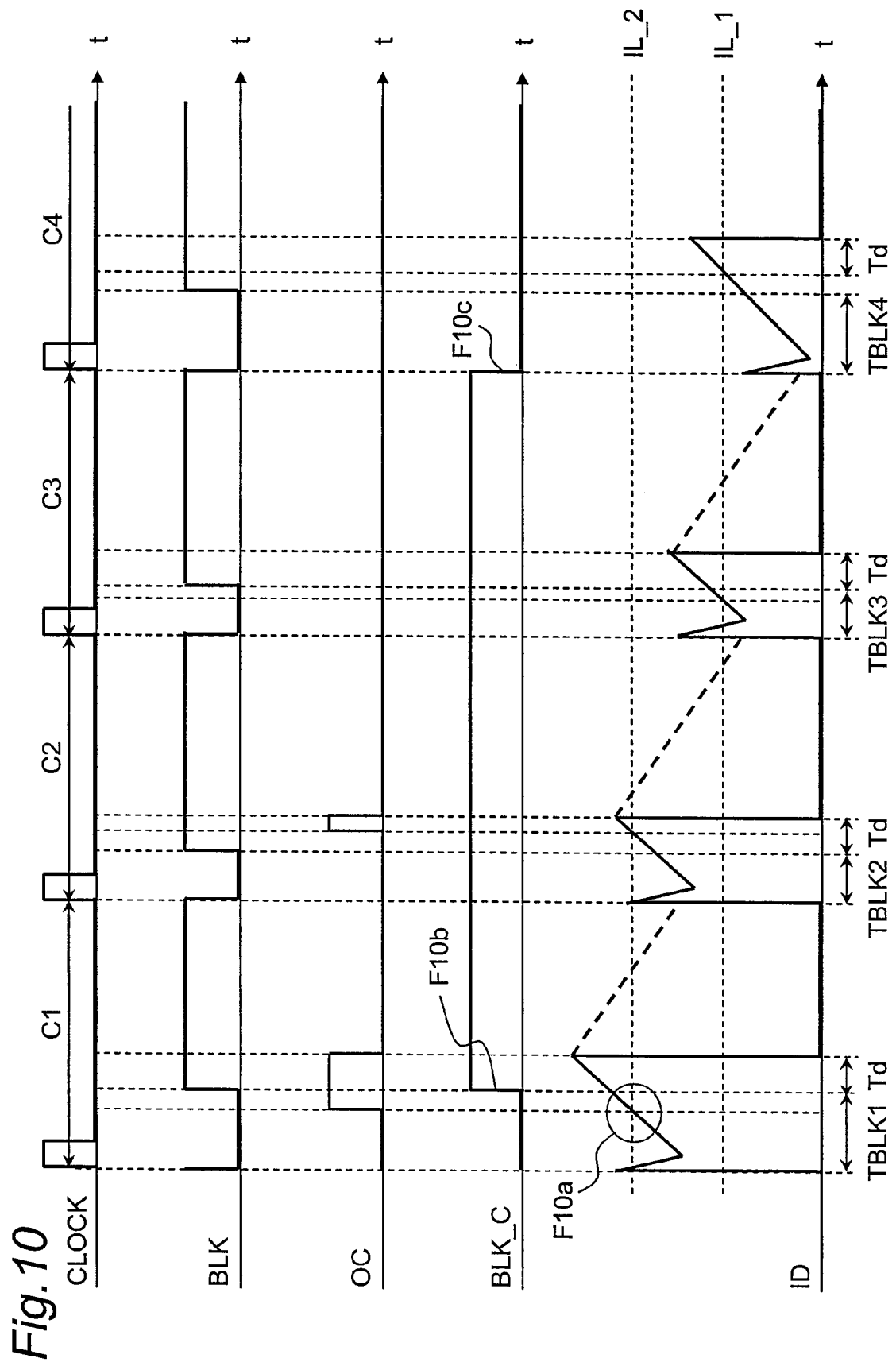
FIG. 10 is a timing chart showing timing when overcurrent protection is canceled in a switching power source apparatus according to Embodiment 3 of the present invention.

FIG. 10 is a timing chart showing timing when the overcurrent state of the switching device 3 is detected in the case that the maximum count value of the counting circuit 24f for overcurrent resolution is three and then overcurrent protection is canceled. The operation of the control circuit 4b according to Embodiment 3 will be described below referring to FIGS. 9 and 10.

In a clock period preceding the clock period C1 by one clock, the adjustment signal BLK_C is low and overcurrent protection is not activated. Hence, the count value of the counting circuit 24f for overcurrent resolution is zero. If the overcurrent state of the switching device 3 is generated as shown in a waveform portion F10a in the clock period C1, the level of the adjustment signal BLK_C is switched from low to high as shown in a waveform portion F10b, and overcurrent protection is activated. While the overcurrent protection is activated, the adjustment signal BLK_C is maintained high. In this state, each time the clock signal CLOCK is output from the clock generating circuit, the level of the logical AND signal S24g of the AND circuit 24g is switched from low to high.

The counting circuit 24f for overcurrent resolution starts counting according to the clock signal CLOCK of the clock period C2, sets the count value to one, and continues to output the count signal S24f having a low level until the count value reaches the maximum count value. Since the adjustment signal BLK_C is maintained high thereafter, the counting circuit 24f for overcurrent resolution increases the count value by one each time the clock signal CLOCK is output from the clock generating circuit 19. When the count value reaches the maximum count value, three, in a clock period C4, the counting circuit 24f for overcurrent resolution switches the count signal S24f from low to high. As a result, the flip-flop circuit 24b is reset by the count signal S24f and switches the level of the adjustment signal BLK_C from high to low as shown in a waveform portion F10c, thereby canceling the overcurrent protection. In other words, when the number of times the drive signal DRIVE becomes low after the generation of the adjustment signal BLK_C reaches the maximum count value, the blanking adjustment circuit 24C stops the generation of the adjustment signal BLK_C.

As described above, in the switching control circuit according to Embodiment 3, the overcurrent state of the switching device 3 is detected, overcurrent protection is activated, and the overcurrent protection is not canceled until a desired number of pulses of the switching operation are generated. With this configuration, the switching device 3 can be maintained in a state in which the overcurrent protection is activated, during a desired period depending on the maximum count value of the counting circuit 24f for overcurrent resolution. Therefore, the device current ID can be made smaller when the overcurrent protection is canceled, and more effective overcurrent protection can be achieved.

Embodiment 4

In the following description of Embodiment 4, differences from Embodiment 3 will be mainly described. Since the configurations, operations and effects other than those relating to the differences are similar to those according to Embodiment 3, their descriptions are omitted.

Figure 11:
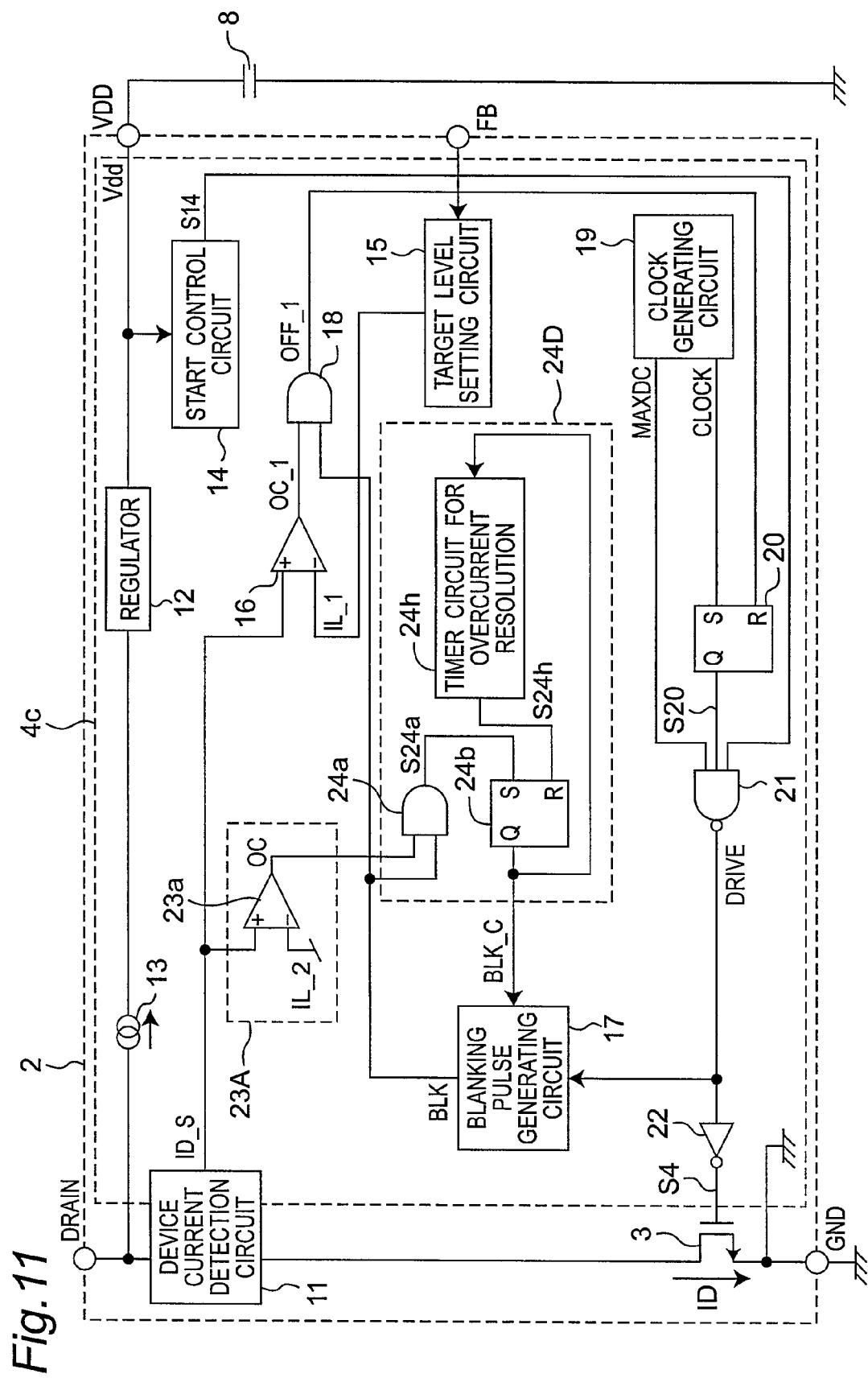
FIG. 11 is a block diagram showing a configuration example of a switching control circuit according to Embodiment 4 of the present invention.

FIG. 11 is a block diagram showing a configuration example of a switching control circuit according to Embodiment 4. In FIG. 11, the configuration of a control circuit 4c differs from that of the control circuit according to Embodiment 3 in that a blanking adjustment circuit 24D inside the control circuit 4c contains a timer circuit 24h for overcurrent resolution and that the flip-flop circuit 24b is reset using the timer circuit 24h for overcurrent resolution.

The timer circuit 24h for overcurrent resolution receives the adjustment signal BLK_C. When the level of the adjustment signal BLK_C is switched from low to high, the timer circuit 24h for overcurrent resolution starts timer operation. After a predetermined timer setting period has passed, the timer circuit 24h for overcurrent resolution switches the level of the timer signal S24h thereof from low to high, and then resets its timer operation.

Figure 12:
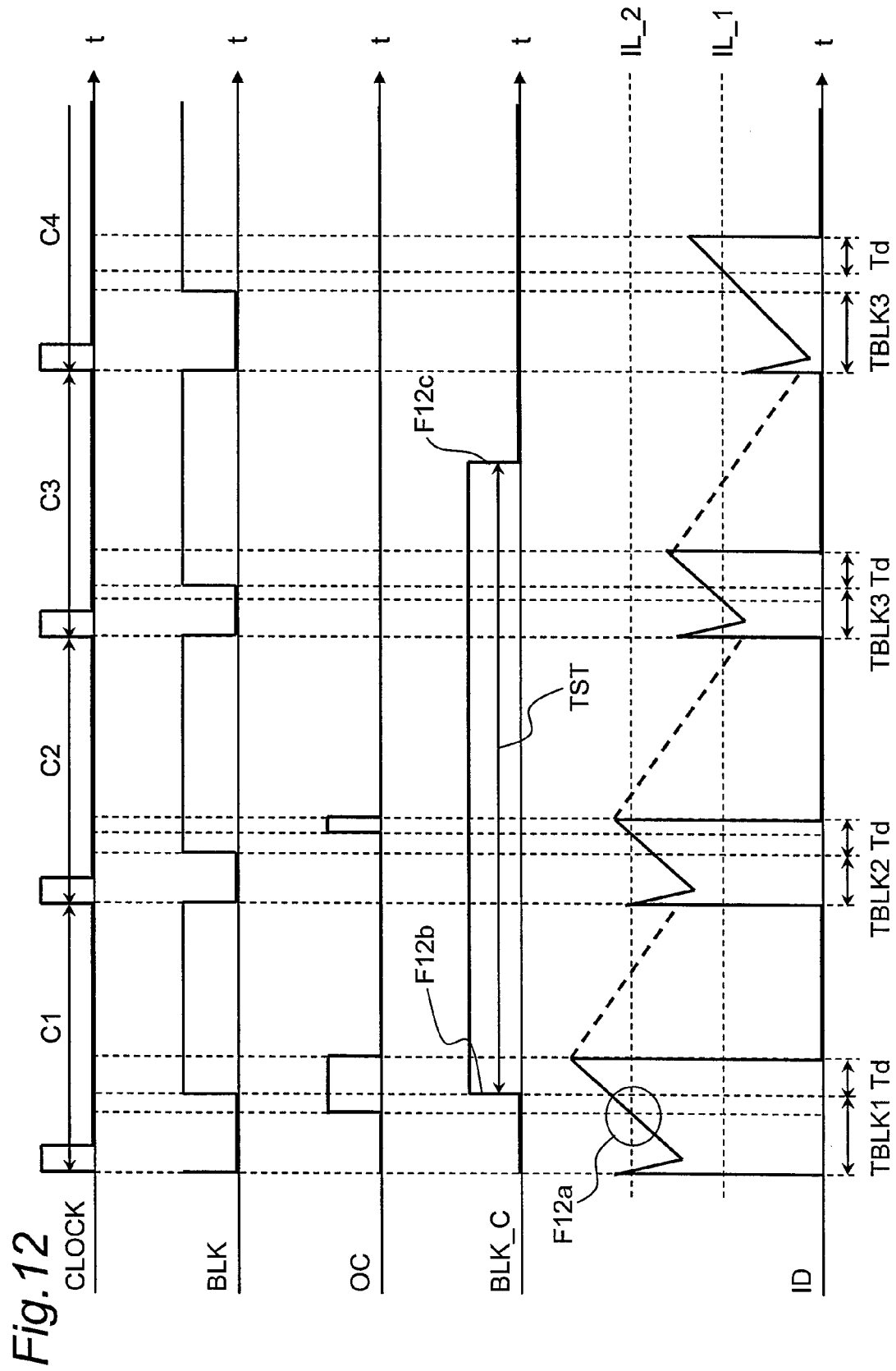
FIG. 12 is a timing chart showing timing when overcurrent protection is canceled in a switching power source apparatus according to Embodiment 4 of the present invention.

FIG. 12 is a timing chart showing timing when the overcurrent state of the switching device 3 was detected, and the predetermined timer setting period has passed, and then overcurrent protection is canceled. The operation of the control circuit 4c according to Embodiment 4 will be described below referring to FIGS. 11 and 12.

In a clock period preceding the clock period C1 by one clock, the adjustment signal BLK_C is low and overcurrent protection is not activated. Hence, the timer circuit 24h for overcurrent resolution does not perform its timer operation, but outputs the timer signal S24h having a low level.

In the clock period C1, if the overcurrent state of the switching device 3 occurs as shown in a waveform portion F12a, the level of the adjustment signal BLK_C is switched from low to high as shown in a waveform portion F12b. When overcurrent protection is activated, the timer circuit 24h for overcurrent resolution starts the timer operation. However, until a timer setting period TST passes, the timer circuit 24h for overcurrent resolution continues to output the timer signal S24h having a low level.

The adjustment signal BLK_C is maintained high thereafter. When the timer setting period TST has passed, the timer circuit 24h for overcurrent resolution switches the level of the timer signal S24h from low to high. As a result, the flip-flop circuit 24b is reset by the timer signal S24h and switches the level of the adjustment signal BLK_C from high to low as shown in a waveform portion F12c, thereby canceling the overcurrent protection. In other words, the blanking adjustment circuit 24D stops the generation of the adjustment signal BLK_C after the timer setting period TST has passed after the adjustment signal BLK_C was generated.

As described above, in the switching control circuit according to Embodiment 4, the overcurrent protection is not canceled until a desired period passes after the overcurrent state of the switching device 3 was detected and the overcurrent protection was activated. As a result, a delay time can be set between the activation and cancellation of the overcurrent protection depending on the timer setting period of the timer circuit 24h for overcurrent resolution. Therefore, an effect of making the device current ID smaller when the overcurrent protection is canceled can be obtained as in the case of Embodiment 3.

Embodiment 5

In the following description of Embodiment 5, differences from Embodiment 3 will be mainly described. Since the configurations, operations and effects other than those relating to the differences are similar to those according to Embodiment 3, their descriptions are omitted.

Figure 13:
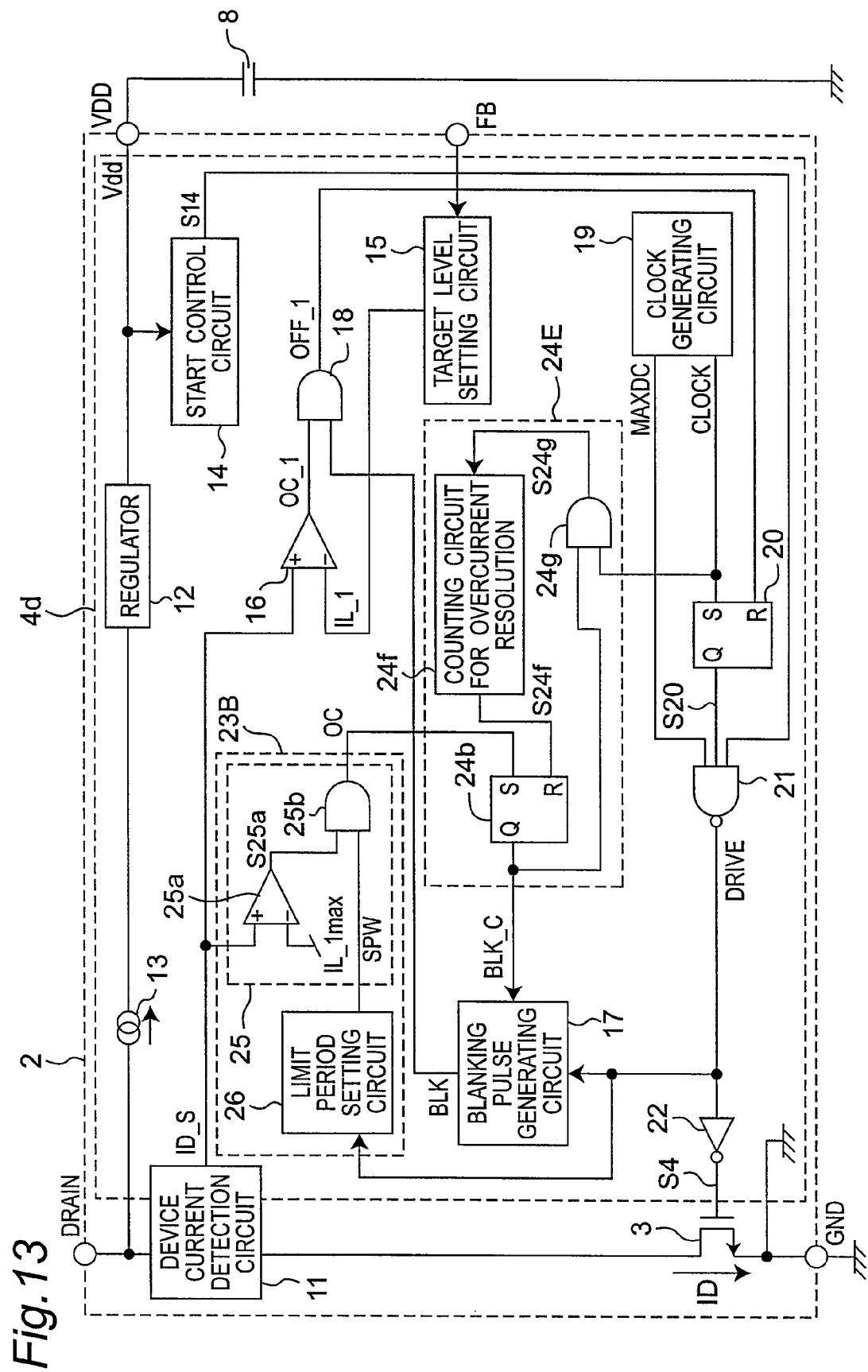
FIG. 13 is a block diagram showing a configuration example of a switching control circuit according to Embodiment 5 of the present invention.

FIG. 13 is a block diagram showing a configuration example of a switching control circuit according to Embodiment 5. In FIG. 13, the configuration of an overcurrent detection circuit 23B inside a control circuit 4d differs from that of the overcurrent detection circuit according to Embodiment 3. The overcurrent detection circuit 23B contains a limit period setting circuit 26 and an ON period detection circuit 25. The ON period detection circuit 25 contains a comparison circuit 25a for short ON period detection and an AND circuit 25b.

In Embodiment 3, its configuration has been described in which the overcurrent state of the switching device 3 is detected and overcurrent protection is activated when the level of the device current ID has become equal to or more than the limit level IL_2 that is higher than the target level IL_1. On the other hand, in Embodiment 5, its configuration will be described below in which the overcurrent state of the switching device 3 is detected and overcurrent protection is activated when the ON period Ton of the switching device 3 has become short and nearly close to a predetermined limit period (described later).

On the basis of the drive signal DRIVE, the limit period setting circuit 26 generates a limit period signal SPW that falls from high to low at the turn-ON time point of the switching device 3 and rises from low to high after a predetermined limit period TSPW has passed after the turn-ON time point. The ON period detection circuit 25 detects a short ON period Ton of the switching device 3 and generates the overcurrent detection signal OC on the basis of the limit period signal SPW and the device current detection signal ID_S.

In the ON period detection circuit 25, the comparison circuit 25a for short ON period detection compares the level of the device current detection signal ID_S with a predetermined maximum target level IL_1 max and generates a comparison result signal S25a. The maximum target level IL_1max represents a level approximately equal to the maximum level of the target level IL_1 and is preset. While the limit period signal SPW is low, the AND circuit 25b nullifies the comparison result signal S25a. When the limit period signal SPW becomes high, the AND circuit 25b allows the comparison result signal S25a to pass through and outputs the signal as the overcurrent detection signal OC.

The limit period setting circuit 26 sets the limit period TSPW to a period not less than the blanking period TBLK (ordinary period) and shorter than the minimum ON period Tonmin.

Figure 14:
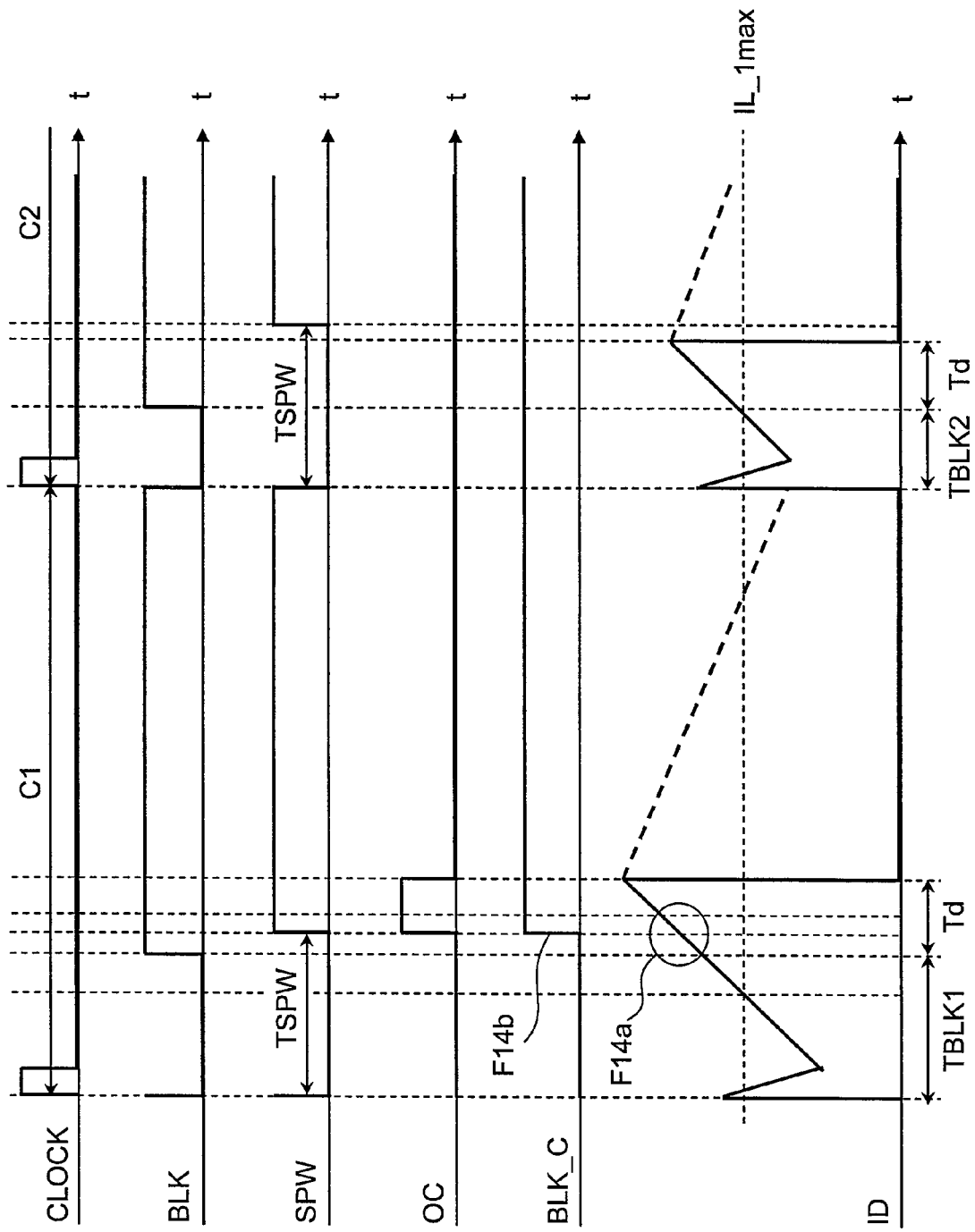
FIG. 14 is a timing chart showing timing when overcurrent protection is activated in a switching power source apparatus according to Embodiment 5 of the present invention.

FIG. 14 is a timing chart showing timing when the overcurrent state of the switching device 3 is detected in the overcurrent detection circuit 23B of the control circuit 4d shown in FIG. 13. In FIG. 14, the limit period setting circuit 26 sets the limit period TSPW to a period slightly longer the blanking period TBLK1 in the ordinary state (that is, the ordinary period). Furthermore, in FIG. 14, the target level setting circuit 15 sets the target level IL_1 so as to be equal to the maximum target level IL_1max. Next, the operation for detecting the overcurrent state of the switching device 3 in the overcurrent detection circuit 23B of the control circuit 4d will be described below referring to FIGS. 13 and 14.

In the case that the output voltage VOUT is low at the starting time and an overload time, the ON period Ton of the switching device 3 gradually becomes shorter. Then, in the period between the completion time point of the limit period TSPW and the turn-OFF time point of the switching device 3 in the clock period C1, the level of the device current ID becomes the maximum target level IL_1max or more as shown in a waveform portion F14a. At this time, the comparison result signal 25a becomes high, and the limit period signal SPW also becomes high, whereby the overcurrent detection signal OC becomes high. When the switching device 3 is turned OFF, the device current ID becomes less than the maximum target level IL_1max, and the level of the overcurrent detection signal OC returns to the low level. As described above, the overcurrent state of the switching device 3 is detected, and overcurrent protection is activated as shown in a waveform portion F14b.

Hence, although the blanking period TBLK of the blanking pulse signal BLK is the blanking period BLK1 (ordinary period) in the clock period C1, the blanking period TBLK becomes the blanking period TBLK2 (adjustment period) in the clock period C2. Hence, the ON period Ton represented by the sum of the blanking period TBLK2 and the delay time Td becomes shorter than the limit period TSPW, and the overcurrent detection signal OC is maintained low. In other words, the limit period TSPW is set so as to be longer than the period represented by the sum of the blanking period TBLK2 and the delay time Td. As described above, in the case that the level of the device current detection signal ID_S is the maximum target level IL_1max or more after the limit period TSPW has passed after the drive signal DRIVE became low, the overcurrent detection circuit 23B generates the overcurrent detection signal OC.

As described above, in the switching control circuit according to Embodiment 5, a state in which, after the switching device 3 was turned ON, the level of the device current ID has become larger than the maximum target level IL_1max before the limit period TSPW passes is detected as the overcurrent state of the switching device 3. Hence, overcurrent protection is activated early, that is, before the device current ID actually becomes large, whereby the device current ID can be made smaller. Therefore, Embodiment 5 can obtain an effect equivalent to or higher than that of Embodiment 3.

Embodiment 6

In the following description of Embodiment 6, differences from Embodiments 4 and 5 will be mainly described. Since the configurations, operations and effects other than those relating to the differences are similar to those according to Embodiments 1 to 5, their descriptions are omitted.

Figure 15:
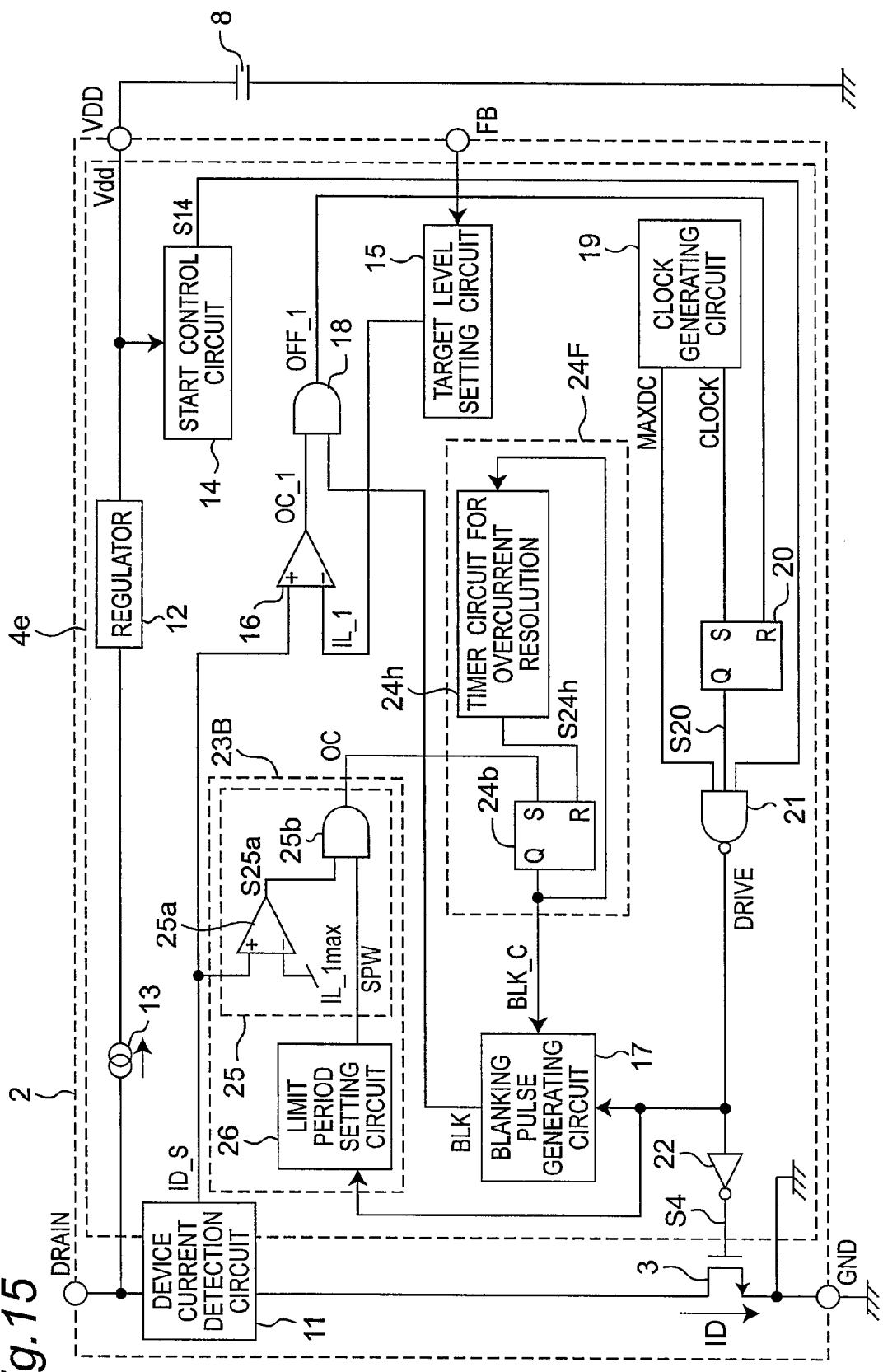
FIG. 15 is a block diagram showing a configuration example of a switching control circuit according to Embodiment 6 of the present invention.
Figure 16:
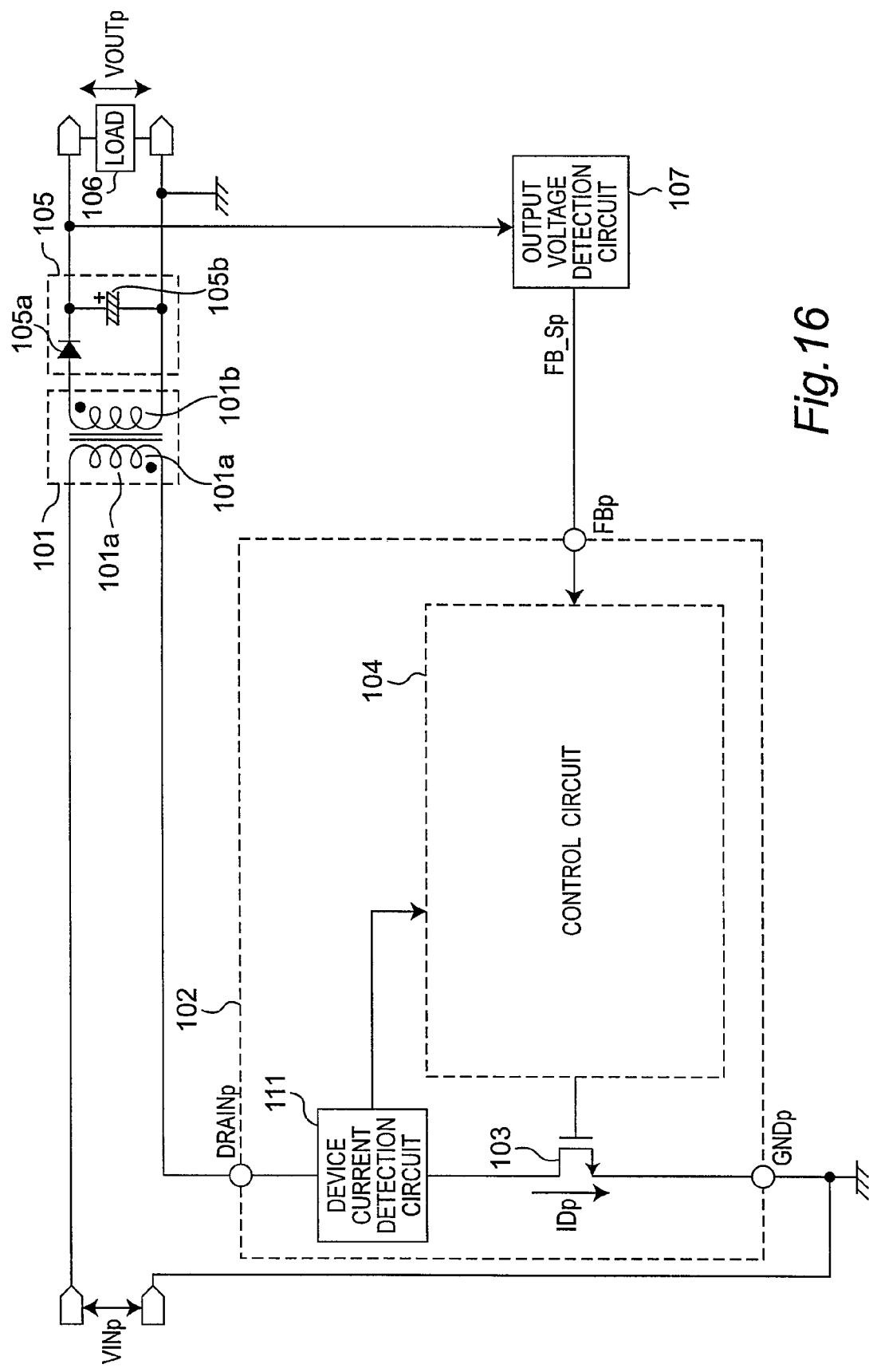
FIG. 16 is a block diagram showing a configuration example of a conventional switching power source apparatus.
Figure 17:
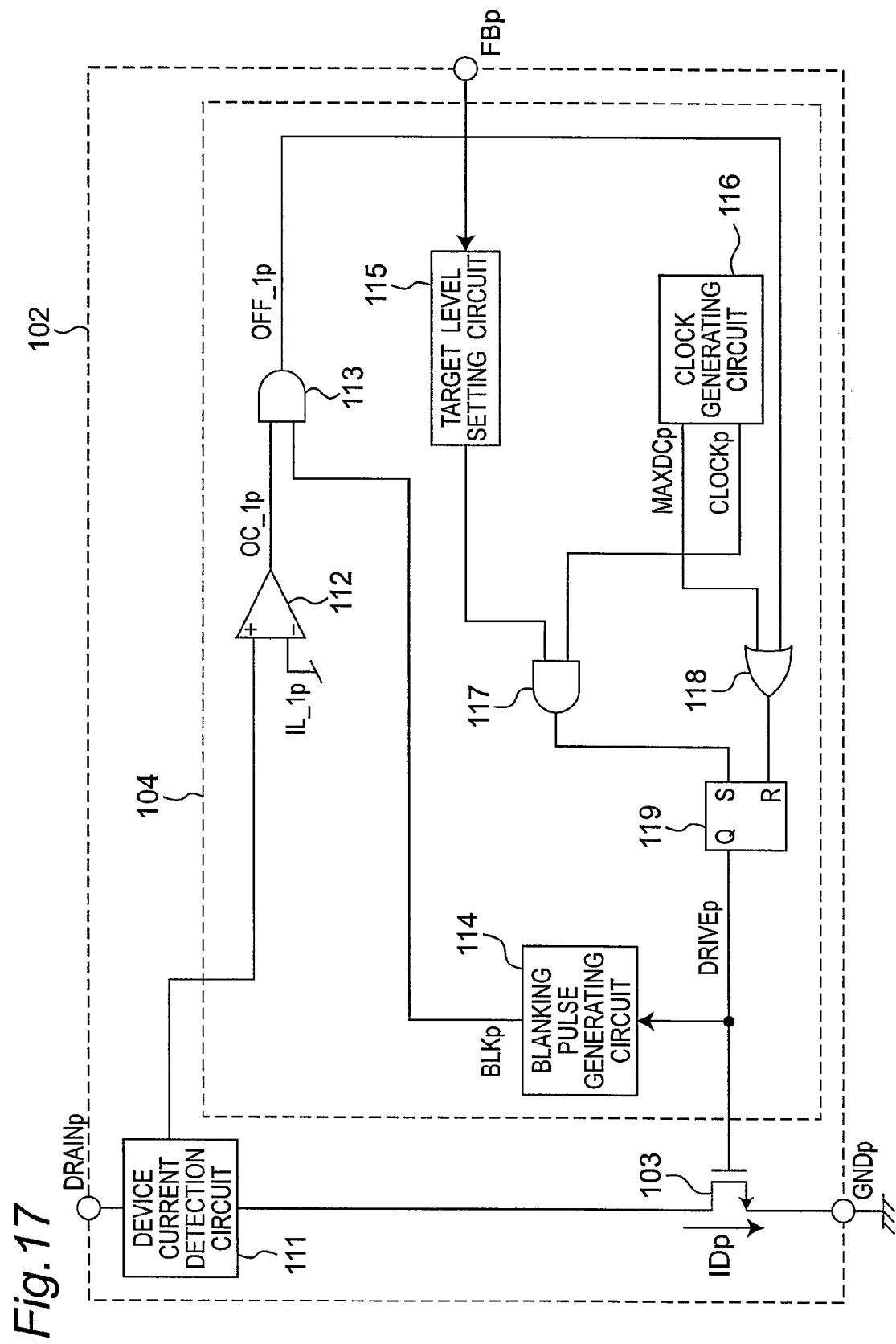
FIG. 17 is a block diagram showing a configuration example of a conventional switching control circuit.
Figure 18:
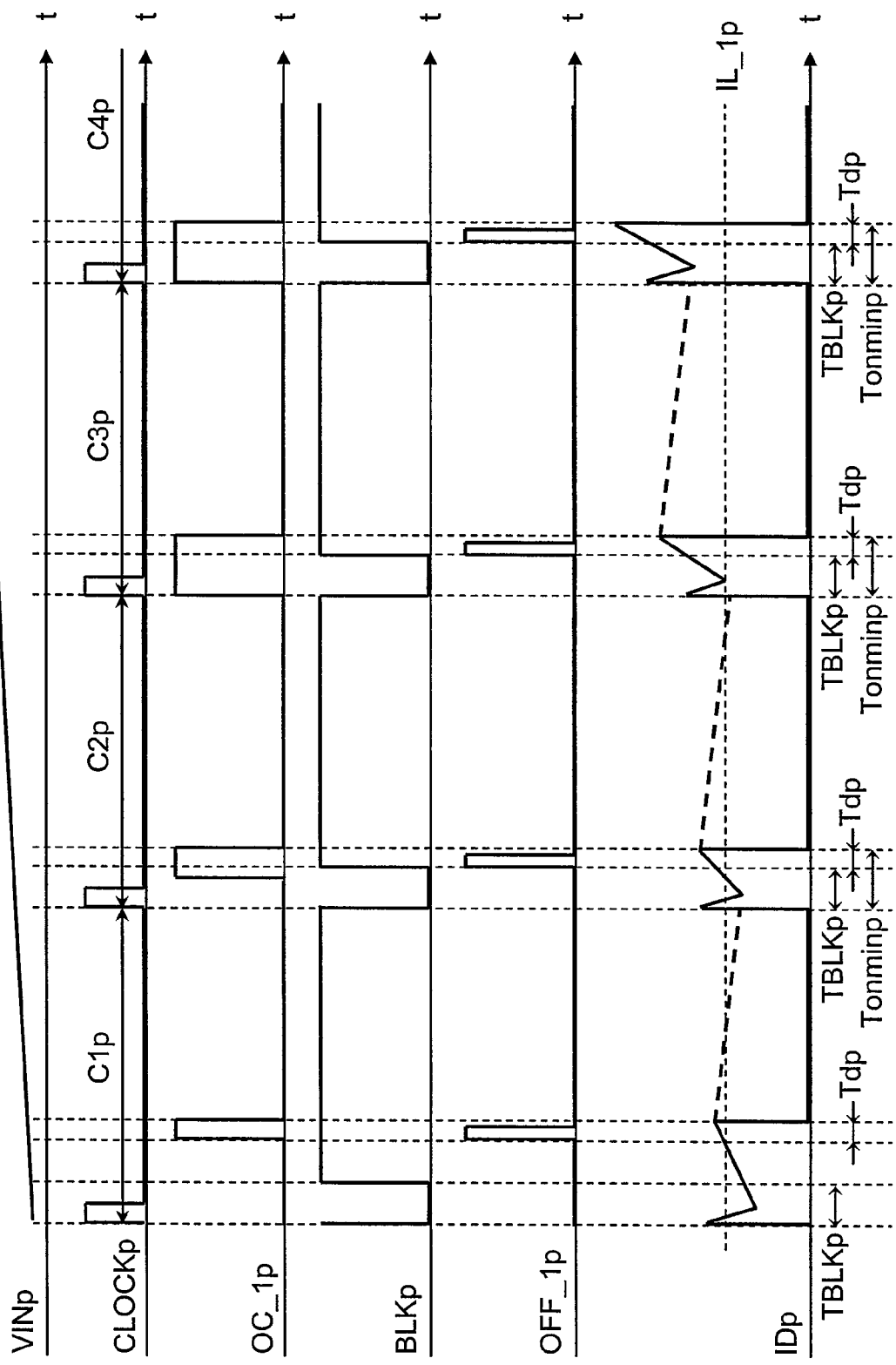
FIG. 18 is a timing chart showing timing when an overcurrent state has occurred in the conventional switching power source apparatus.
Figure 19:
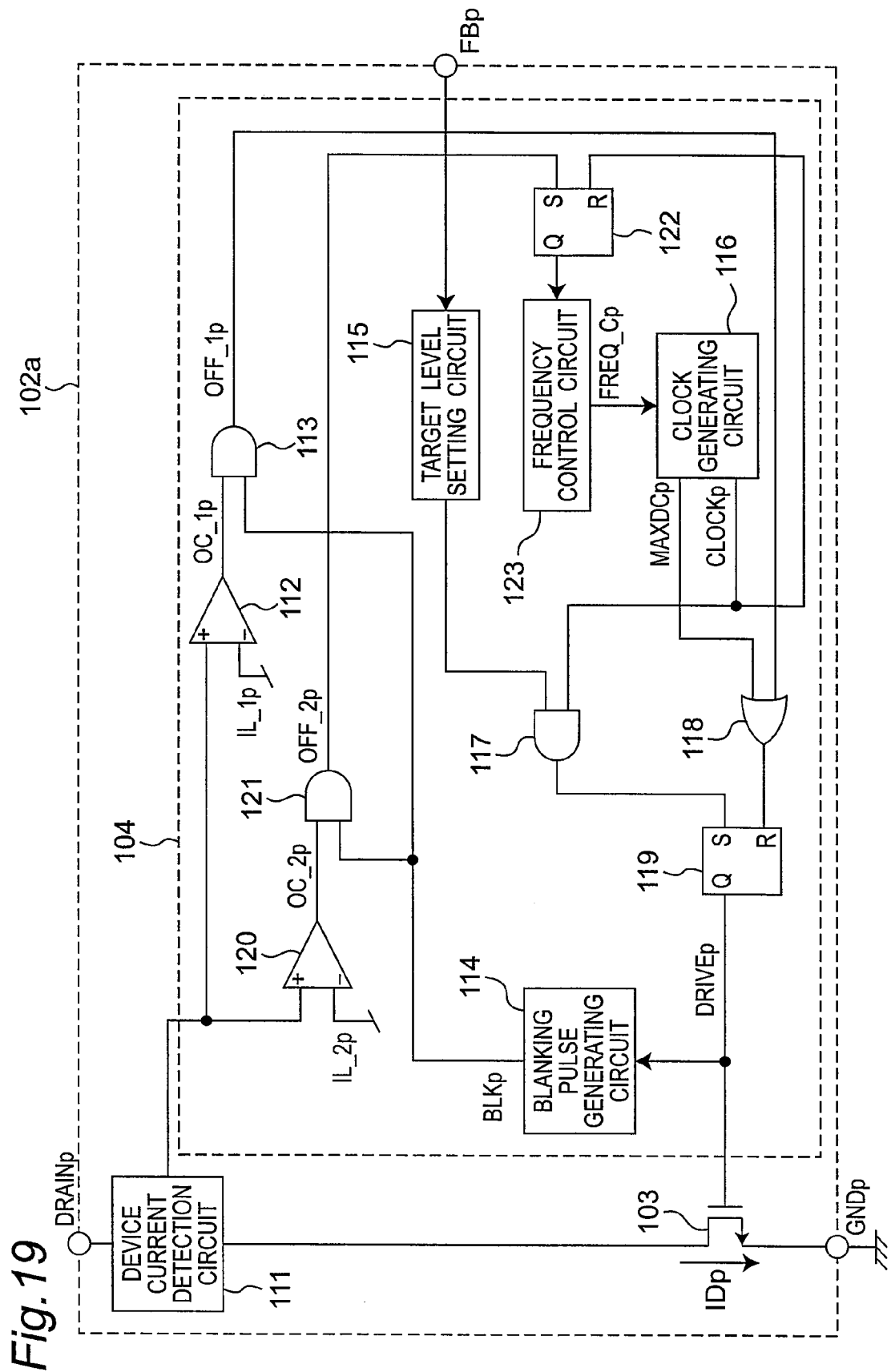
FIG. 19 is a block diagram showing a configuration example of another conventional switching control circuit.
Figure 20:
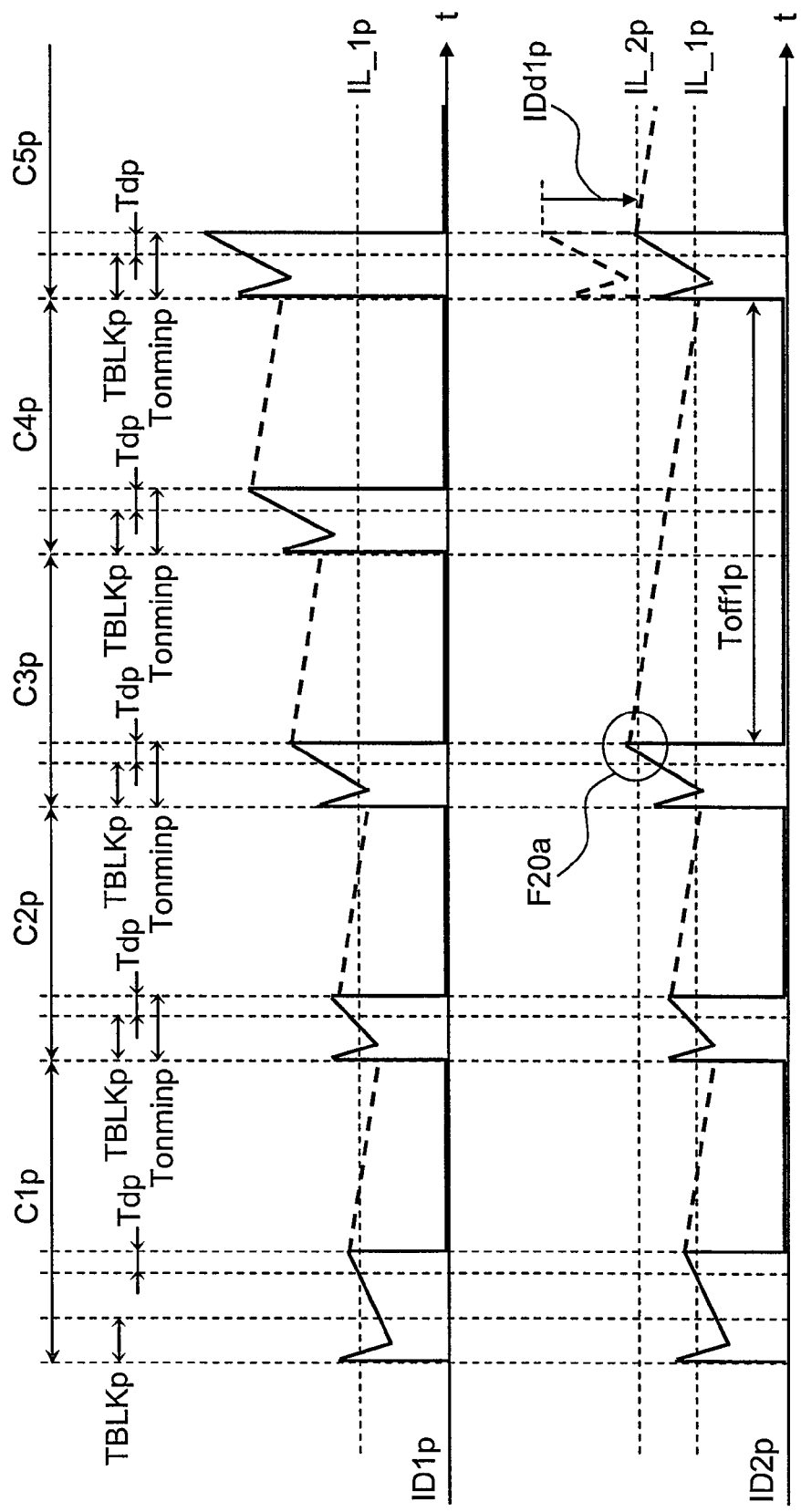
FIG. 20 is a timing chart showing timing when overcurrent protection is activated in another switching power source apparatus.
Figure 21:
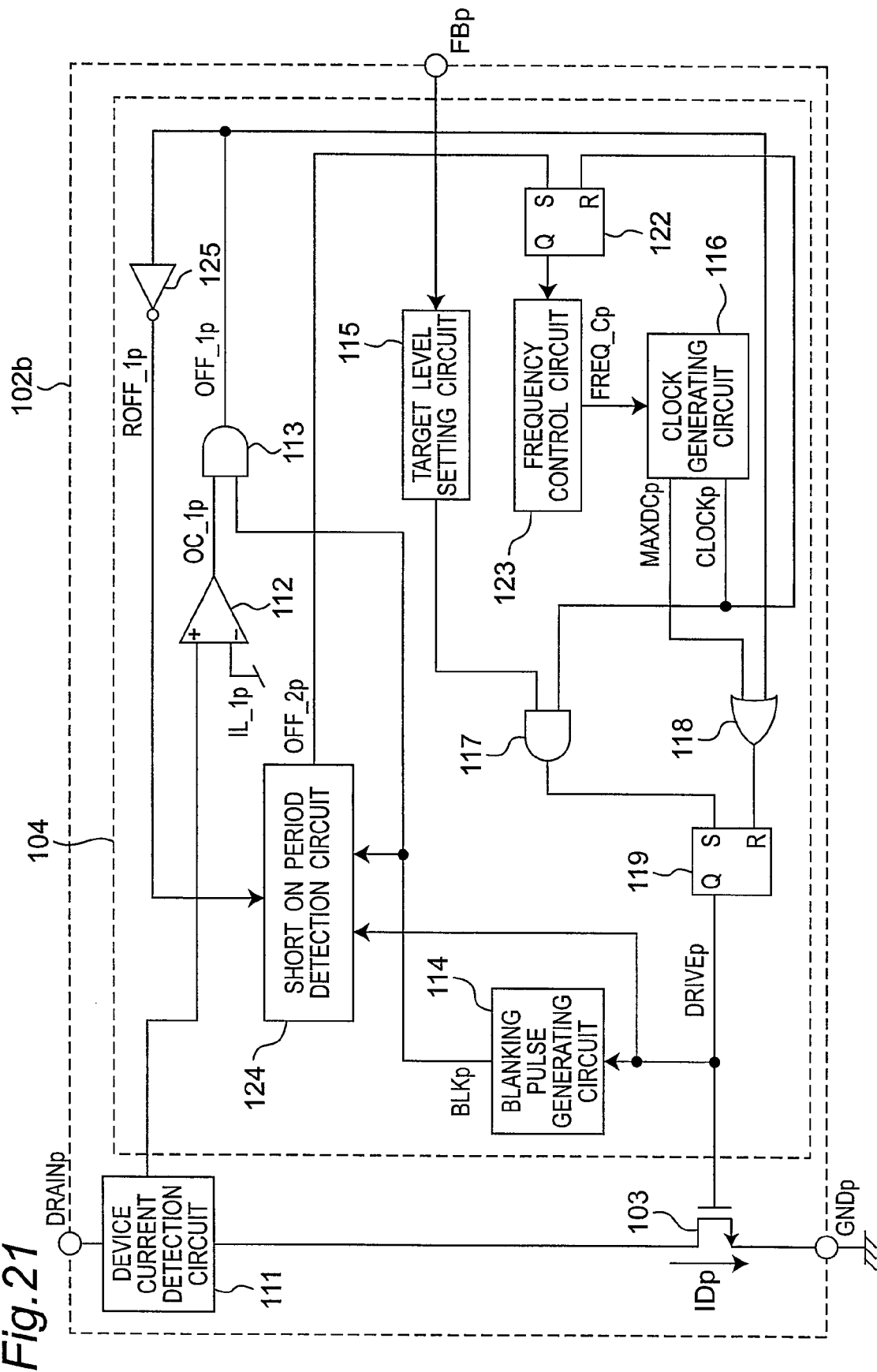
FIG. 21 is a block diagram showing a configuration example of still another conventional switching control circuit.
Figure 22:
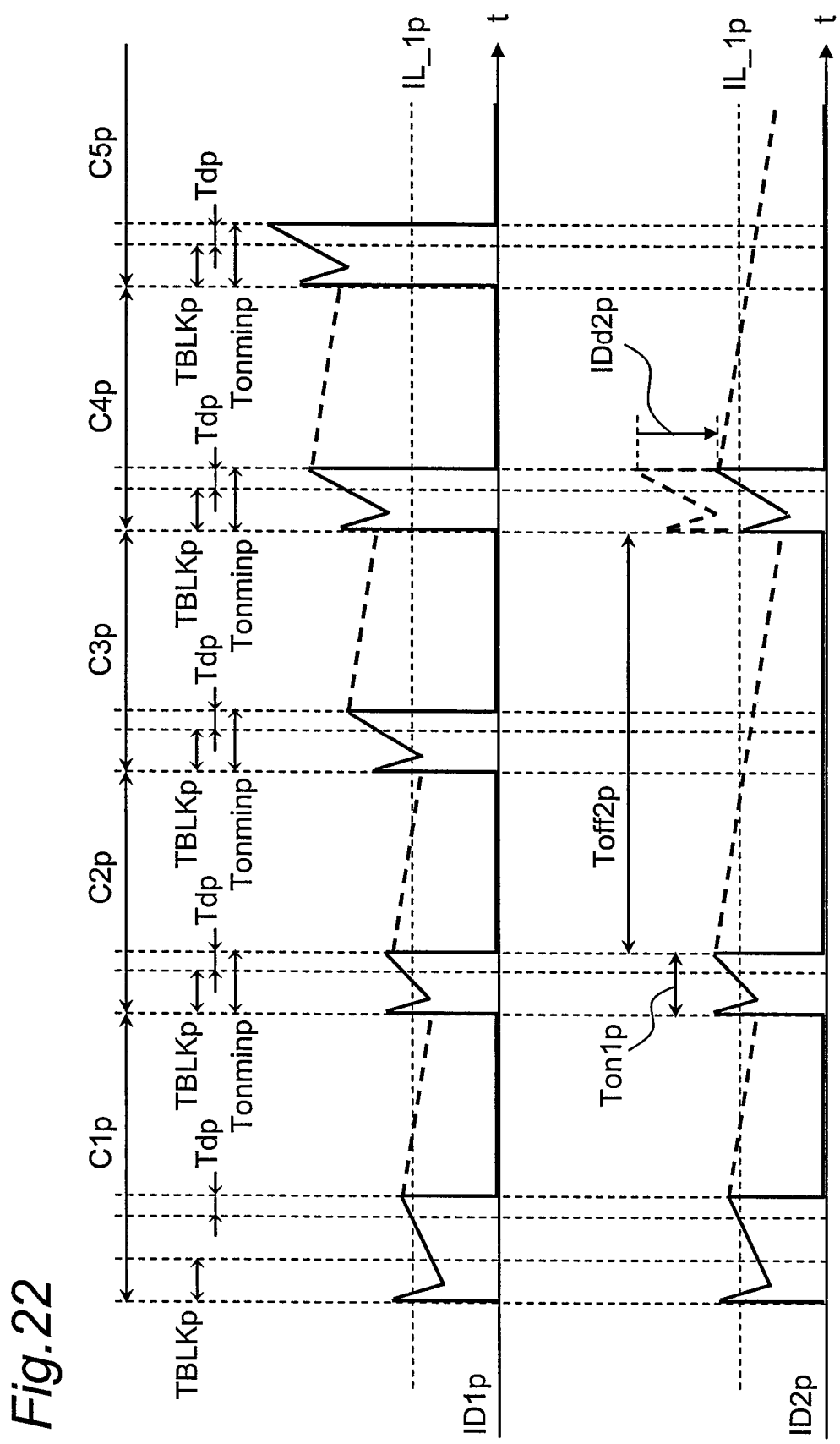
FIG. 22 is a timing chart showing timing when overcurrent protection is activated in still another switching power source apparatus.
Figure 23:
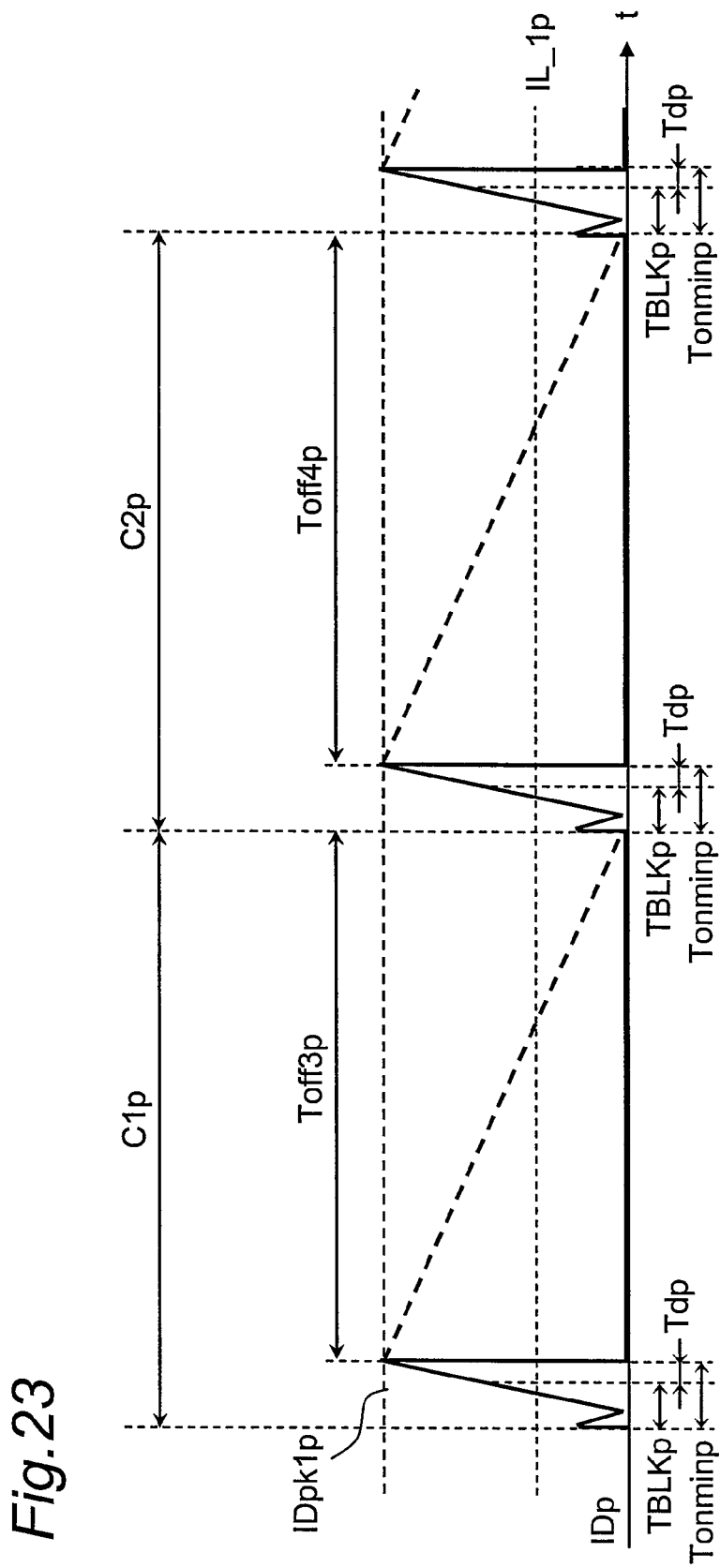
FIG. 23 is a waveform diagram showing the waveform of a device current in the overcurrent state of a switching device in the conventional switching power source apparatus.
Figure 24:
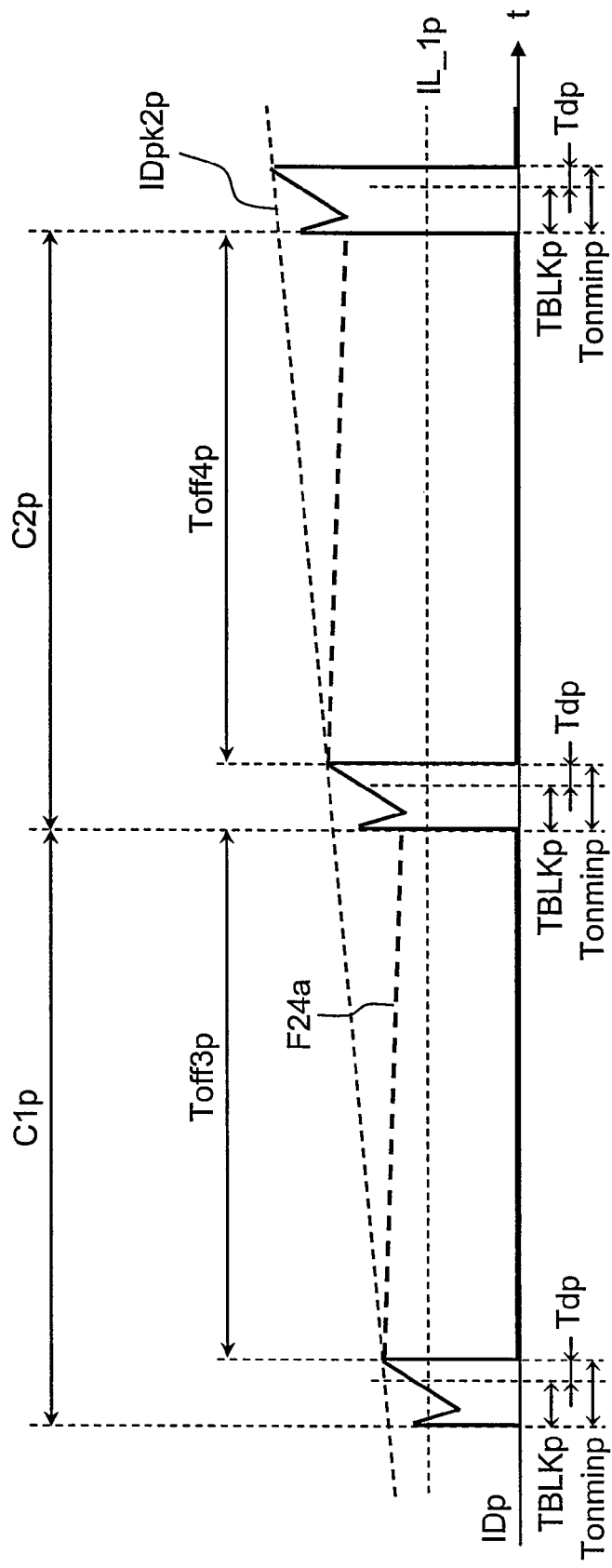
FIG. 24 is another waveform diagram showing the waveform of a device current in the overcurrent state of the switching device in the conventional switching power source apparatus.

FIG. 15 is a block diagram showing a configuration example of a switching control circuit according to Embodiment 6.

The configuration of the overcurrent detection circuit 23B inside a control circuit 4e is similar to that according to Embodiment 5, and a blanking adjustment circuit 24F is equipped with the timer circuit 24h for overcurrent resolution as in the case of Embodiment 4. Hence, the overcurrent state of the switching device 3 is detected and overcurrent protection is activated by an operation similar to that of Embodiment 5, and the overcurrent protection is canceled by an operation similar to that of Embodiment 4.

According to Embodiment 6, overcurrent protection in which the effects of Embodiments 4 and 5 are combined can be achieved.

SUMMARY OF EMBODIMENTS

As described above, according to Embodiments 1 to 6, at the starting time and an overload time in which the output voltage of the switching power source apparatus is low, if an overcurrent state, in which the ON period of the switching device becomes short and a current not less than the current limit value of the switching device flows through the switching device, occurs, this overcurrent state is detected. The blanking period of the blanking pulse signal is made shorter than the blanking period that is obtained during steady operation, and the ON period of the switching device is made short. Hence, the device current flowing through the switching device can be made small in each pulse for the switching operation, and, at the same time, the device current can be suppressed from increasing each time a pulse for the switching operation is generated. For this reason, the overcurrent state of the switching device can be resolved, and degradation of and damage to the switching device due to the flow of the device current not less than the allowable current value can be prevented.

In addition, in the case that the inclination of the waveform of the device current flowing through the switching device is large, that is, in the case that the rate of increase in the device current in each pulse for the switching operation is high, and even in the case that the output voltage is limitlessly close to zero and the energy stored in the switching transformer hardly decreases in the OFF period of the switching device, protection is activated to shorten the ON period in each pulse for the switching operation. Hence, the device current in each pulse for the switching operation can be made small, and the increase in the device current in each pulse for the switching operation can be suppressed. As a result, the switching device can be prevented from being degraded and damaged.

Furthermore, even in the case that the characteristics of the components inside the switching power source apparatus have changed due to variations and temperature characteristics of the components, protection is activated to shorten the ON period in each pulse for the switching operation. As a result, the effect hardly decreases, and the reliability of the switching power source apparatus can be improved.

Besides, according to Embodiments 2 to 6, a function of not canceling the overcurrent protection in a predetermined period after the overcurrent protection was activated for the switching device is provided. Hence, the device current can be made further smaller when the overcurrent protection is canceled, and the switching device can be prevented more securely from being degraded and damaged.

A semiconductor device formed into a monolithic integrated circuit can be formed easily by providing the switching control circuit containing the switching device and the control circuit inside one semiconductor chip. Furthermore, for example, a semiconductor device can also be formed such that the switching device is formed of one semiconductor chip, the control circuit is formed of another semiconductor chip, and the two semiconductor chips are incorporated into one module. As described above, by providing the main circuit components inside one semiconductor chip, the number of components constituting the circuit can be reduced. Hence, a switching control circuit serving as a power source apparatus can be made smaller in size, lighter in weight and lower in cost easily.

In Embodiments 1 to 6, although the device current detection circuit is configured so as to detect the device current flowing through the switching device, the circuit may also be configured so as to detect the drain-source voltage (ON voltage) of the switching device reflecting the device current, that is, the voltage across the terminals of the switching device.

Furthermore, in Embodiments 1 to 6, although a primary/secondary insulated or non-insulated flyback switching power source is described, the technology according to the present invention is not affected by the configuration of the power source, and the power source may be, for example, a chopper power source containing a choke coil.

Moreover, in Embodiments 1 to 6, the configuration in which the feedback signal generated from the output voltage detection circuit is fed back to the control circuit is adopted as a configuration for stabilizing the output voltage to a predetermined voltage. However, the feedback configuration is not limited particularly. For example, it may be possible to use a configuration in which an auxiliary winding is provided in the switching transformer and this auxiliary winding and the secondary winding are used to perform winding feedback.

With Embodiments 1 to 6, degradation of and damage to the switching device due to the flow of the device current not less than the allowable current value can be prevented. Moreover, these effects are hardly lessened depending on changes in the device current and depending on variations and temperature characteristics of the components inside the switching power source apparatus. Therefore, the reliability of the switching power source apparatus can be improved, and the present invention is useful for general apparatuses and appliances incorporating switching control circuits, more particularly, built-in power sources for consumer appliances and various electronic appliances.

Examples all embodying the present invention are described in the above descriptions regarding the embodiments. However, the present invention is not limited to these examples but can be applied to various examples that can be configured easily by those skilled in the art using the technology according to the present invention.

What is claimed is:

1. A switching control circuit comprising:
a switching device being switched between an ON state and an OFF state repeatedly,
a current detection circuit operable to detect the magnitude of the current flowing through said switching device and to generate a current detection signal,
a target level setting circuit operable to set the target level of the current detection signal,
a comparison circuit operable to compare the level of the current detection signal with the target level and to generate a comparison result signal,
a drive signal generating circuit operable to generate a drive signal whose level periodically changes from a first level to a second level and changes from the second level to the first level on the basis of the comparison result signal,
a comparison result signal nullification circuit operable to generate a nullification period to nullify the comparison result signal on the basis of the drive signal immediately after the level of the drive signal was changed from the first level to the second level, and
a nullification period adjustment circuit operable to generate a nullification period adjustment signal representing a signal for adjusting the nullification period after detecting the overcurrent state of said switching device on the basis of the current detection signal, wherein
said switching device is in the ON state when the level of the drive signal is the first level and is in the OFF state when the level of the drive signal is the second level, and the period of the ON state is shortened when the nullification period adjustment circuit is generated.

2. The switching control circuit according to claim 1, wherein, when the nullification period adjustment signal is generated, said comparison result signal nullification circuit shortens the nullification period.

3. The switching control circuit according to claim 1, wherein said comparison result signal nullification circuit comprises:
a nullification signal generating circuit operable to generate a nullification signal during the nullification period from the time point when the level of the drive current was changed from the first level to the second level, and
a nullification execution circuit operable to nullify the comparison result signal while the nullification signal is generated.

4. The switching control circuit according to claim 3, wherein said nullification period adjustment circuit comprises:
an overcurrent detection circuit operable to detect the overcurrent state of said switching device and to generate an overcurrent detection signal when the level of the current detection signal becomes a predetermined first limit level or more, and a nullification period adjustment signal generating circuit operable to generate a nullification period adjustment signal when the overcurrent detection signal is generated, wherein said nullification signal generating circuit shortens the nullification period when the nullification period adjustment signal is generated.

5. The switching control circuit according to claim 4, wherein the first limit level is higher than the target level.

6. The switching control circuit according to claim 4, wherein said nullification period adjustment signal generating circuit stops the generation of the nullification period adjustment signal when the generation of the overcurrent detection signal is stopped.

7. The switching control circuit according to claim 4, wherein said nullification period adjustment signal generating circuit stops the generation of the nullification period adjustment signal when the level of the current detection signal becomes less than a second limit level that is lower than the first limit level.

8. The switching control circuit according to claim 4, wherein said nullification period adjustment signal generating circuit stops the generation of the nullification period adjustment signal when the number of times the level of the drive signal becomes the second level after the generation of the nullification period adjustment signal reaches a predetermined number of times.

9. The switching control circuit according to claim 4, wherein said nullification period adjustment signal generating circuit stops the generation of the nullification period adjustment signal after a predetermined period has passed after the nullification period adjustment signal was generated.

10. The switching control circuit according to claim 4, wherein said overcurrent detection circuit generates the overcurrent detection signal in the case that the level of the current detection signal is not less than a predetermined level after a predetermined period has passed after the level of the drive signal became the second level.

11. The switching control circuit according to claim 1, wherein said current detection circuit detects the voltage across the terminals of said switching device.

12. A semiconductor device comprising said switching control circuit according to claim 1 on one semiconductor chip.

13. A switching power source apparatus comprising said semiconductor device according to claim 12.

14. A semiconductor device comprising said switching control circuit according to claim 1 on multiple semiconductor chips, wherein said multiple semiconductor chips are incorporated into one module.

15. A switching power source apparatus comprising said semiconductor device according to claim 14.

16. A switching power source apparatus comprising said switching control circuit according to claim 1.

17. The switching power source apparatus according to claim 16, further comprising:

an input terminal operable to receive a DC voltage, a switching transformer operable to convert an input voltage switched by said switching device into an output AC current, an output voltage generating circuit operable to rectify and smooth the output AC voltage, and to generate a DC output voltage, and an output voltage detection circuit operable to detect the magnitude of the output voltage and to generate an output voltage detection signal, wherein said target level setting circuit sets the target level on the basis of the output voltage detection signal.

* * * * *